United States Patent
Kolen

(10) Patent No.: US 10,382,940 B1
(45) Date of Patent: Aug. 13, 2019

(54) FORMATION OF A MULTIPLE-INPUT SYNCHRONOUS TRANSFER NETWORK

(71) Applicant: C LAN Wireless, Inc., Cardiff, CA (US)

(72) Inventor: Paul Kolen, Cardiff, CA (US)

(*) Notice: Subject to any disclaimer, the term of this patent is extended or adjusted under 35 U.S.C. 154(b) by 0 days.

(21) Appl. No.: 15/950,015

(22) Filed: Apr. 10, 2018

(51) Int. Cl.
*H04W 8/00* (2009.01)

(52) U.S. Cl.
CPC .................. *H04W 8/005* (2013.01)

(58) Field of Classification Search
CPC ..................................................... H04W 8/005
See application file for complete search history.

(56) References Cited

U.S. PATENT DOCUMENTS

| | | | | |
|---|---|---|---|---|
| 9,054,961 B1* | 6/2015 | Kim | .................... | H04L 41/0806 |
| 10,182,043 B2* | 1/2019 | Gu | ......................... | H04L 63/08 |
| 2016/0345277 A1* | 11/2016 | Segev | ................. | H04W 56/001 |
| 2017/0093619 A1* | 3/2017 | Chen | ..................... | G06F 16/951 |
| 2018/0262597 A1* | 9/2018 | Matthieu | ................. | H04L 69/18 |

* cited by examiner

*Primary Examiner* — Duc C Ho
(74) *Attorney, Agent, or Firm* — Mintz Levin Cohn Ferris Glovsky and Popeo, P.C.

(57) ABSTRACT

A system for wireless communication is provided. In some implementations, the system performs operations including transmitting a first packet to a second device, the first packet comprising a first identifier of the first device. The operations further include receiving a second packet from the second device, the second packet comprising a second identifier of the second device. The operations further include assigning, in response to the second packet, a network identifier and a network channel to the second device based on the second identifier. The operations further include storing the network identifier, the second identifier, and the network channel, in a database accessible by the first device. The operations further include transmitting a third packet to the second device. The operations further include transmitting a fourth packet to the second device, the fourth packet triggering a communication from the second device to the first device.

21 Claims, 16 Drawing Sheets

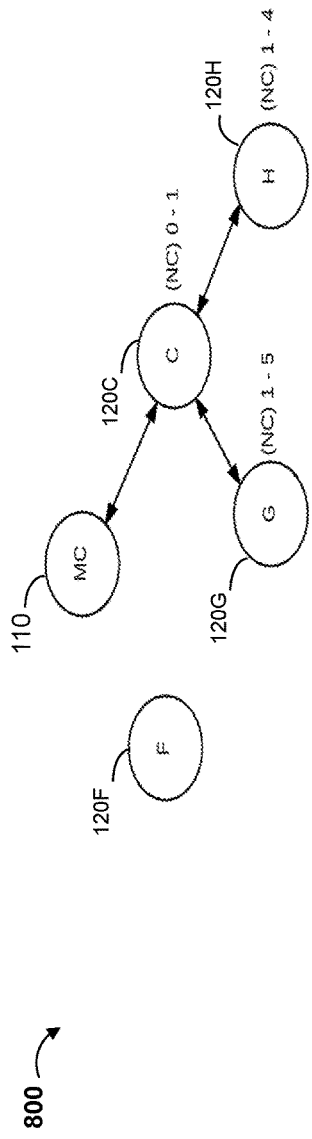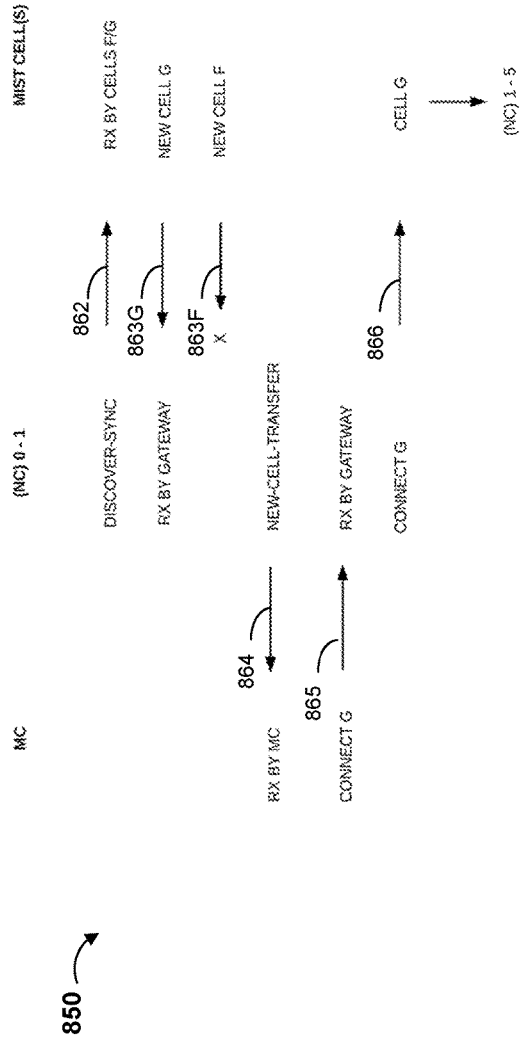
FIG. 8A
FIG. 8B

FORMATION OF A MULTIPLE-INPUT SYNCHRONOUS TRANSFER NETWORK

TECHNICAL FIELD

The subject matter described herein relates to wireless communications.

BACKGROUND

The Internet of things (IoT) refers to a group of objects that engage in machine-to-machine communication. For example, commonplace objects such as automobiles, household appliances, and wearables, may be embedded with electronic, software, sensors, actuators, and network connectivity to enable these objects to collect and exchange data.

SUMMARY

In some aspects, a method, computer program product and system are provided. In an implementation, a method is provided. The method may include transmitting a first packet to a second device, the first packet comprising a first identifier of the first device. The method may further include receiving a second packet from the second device, the second packet comprising a second identifier of the second device. The method may further include assigning, in response to the second packet, a network identifier and a network channel to the second device based on the second identifier, the network identifier indicating an order of assimilation of the second device to the network. The method may further include storing the network identifier, the second identifier, and the network channel, in a database accessible by the first device. The method may further include transmitting a third packet to the second device, the third packet comprising the network identifier and the assigned network channel to the second device. The method may further include transmitting a fourth packet to the second device. In some aspects, the fourth packet triggers a communication from the second device to the first device, the communication comprising data associated with a third device in communication with the second device.

In an implementation, a wireless network system is provided. The system may include (or otherwise utilize) at least one processor and/or memory, which may be configured to perform operations including transmitting a first packet to a second device, the first packet comprising a first identifier of the first device. The operations may further include receiving a second packet from the second device, the second packet comprising a second identifier of the second device. The operations may further include assigning, in response to the second packet, a network identifier and a network channel to the second device based on the second identifier, the network identifier indicating an order of assimilation of the second device to the network. The operations may further include storing the network identifier, the second identifier, and the network channel, in a database accessible by the first device. The operations may further include transmitting a third packet to the second device, the third packet comprising the network identifier and the assigned network channel to the second device. The operations may further include transmitting a fourth packet to the second device. In some aspects, the fourth packet triggers a communication from the second device to the first device, the communication comprising data associated with a third device in communication with the second device.

In another aspect, a non-transitory computer program product is provided. The computer program product storing instructions which, when executed by at least one data processor, causes operations including transmitting a first packet to a second device, the first packet comprising a first identifier of the first device. The operations may further include receiving a second packet from the second device, the second packet comprising a second identifier of the second device. The operations may further include assigning, in response to the second packet, a network identifier and a network channel to the second device based on the second identifier, the network identifier indicating an order of assimilation of the second device to the network. The operations may further include storing the network identifier, the second identifier, and the network channel, in a database accessible by the first device. The operations may further include transmitting a third packet to the second device, the third packet comprising the network identifier and the assigned network channel to the second device. The operations may further include transmitting a fourth packet to the second device. In some aspects, the fourth packet triggers a communication from the second device to the first device, the communication comprising data associated with a third device in communication with the second device.

In some variations, one or more features disclosed herein including the following features may optionally be included in any feasible combination. For example, the storing may include storing the network identifier, the second identifier, and the network channel at a remote server. The first device may include a transmitter configured to transmit the first packet, the third packet, and/or the fourth packet; a receiver configured to receive the second packet; and a processor configured to perform the assigning and/or the storing. The second identifier may include a serial number of the second device. The assigning may include: determining a number of devices connected to the first device; and assigning, based on the number of devices, the network identifier to the second device, the network identifier indicating a next sequential integer greater than the number of devices. The second packet may indicate a layer of a network where the second device is located and the assigning of the network identifier may be based on the layer. The operations and/or method may further include receiving, by the first device, a fifth packet from the second device, the fifth packet comprising a third identifier of a fourth device; and assigning, by the first device and in response to the fifth packet, a second network identifier and a second network channel to the fourth device based on the third identifier, the second network identifier indicating an order of assimilation of the third device to the network. The operations and/or method may further include transmitting, by the first device, a fifth packet to the second device, the fifth packet indicating that the second device transmit a sixth packet, the sixth packet comprising the second identifier and triggering a response from a fourth device within a communication range of the second device. The communication from the second device to the first device may be over the assigned network channel. In some aspects, each of the first packet, the second packet, the third packet, the fourth packet, and the communication may be transmitted synchronously in a network comprising the first device, the second device, and the third device.

Implementations of the current subject matter may include systems and methods consistent with the present description, including one or more features as described, as well as articles that include a tangibly embodied machine-readable medium operable to cause one or more machines (e.g., computers, etc.) to result in operations described herein. Similarly, computer systems are also described that may include one or more processors and one or more memories coupled to the one or more processors. A memory, which may include a computer-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 8A depicts a diagram of a network cell connecting another network cell to a network, in accordance with some example implementations;

FIG. 8B depicts an example of a communication exchange between the master cell and the network cells of FIG. 8A, in accordance with some example implementations;

When practical, similar reference numbers denote similar structures, features, or elements.

DETAILED DESCRIPTION

Figure 1:
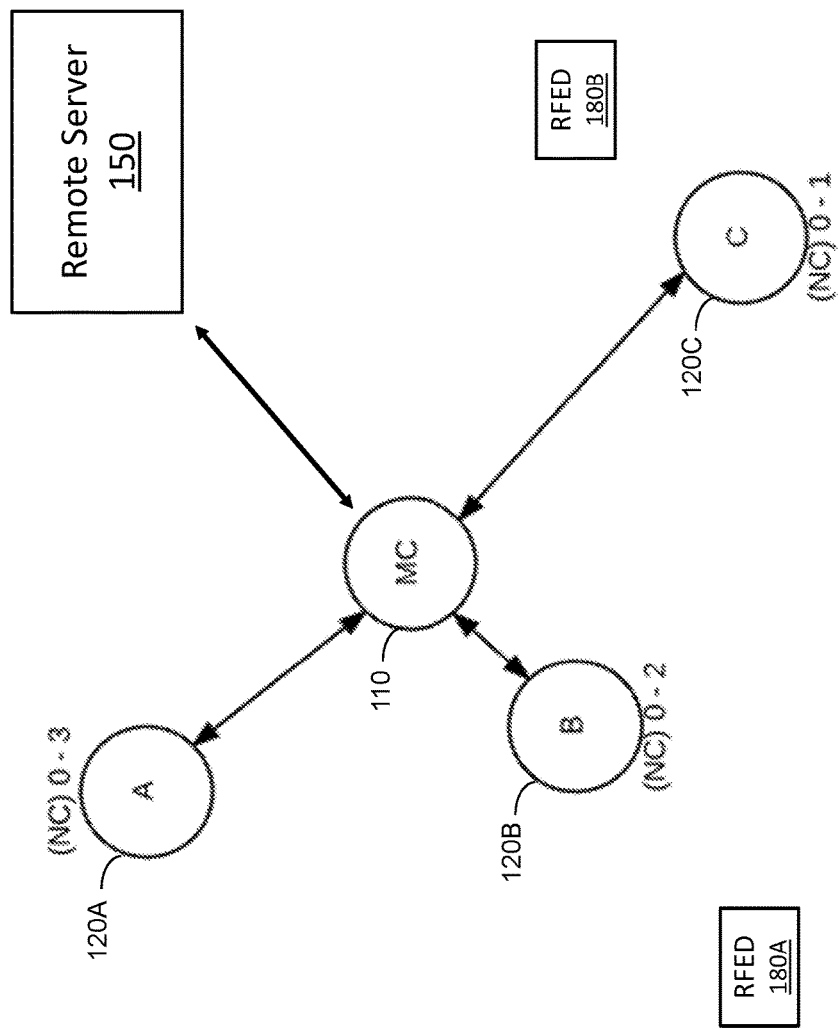
FIG. 1 depicts a diagram of a network for wireless synchronous communications, in accordance with some example implementations.

As the Internet of Things ("IoT") realizes its potential and connects literally billions of RFID tags, sensors, actuators, and other devices that produce an enormous amount of additional data traffic, network congestion may only get worse. The variety of IoT devices may implement different communication protocols which may not be compatible with each other. The large number of IoT devices and their corresponding data communications may make it difficult for a network to transport, process, manage, and deliver a disparate data to end users efficiently, effectively, and in a format and manner that makes it useful and valuable for analytical and decision-making purposes without overloading core networks.

In order to address the challenge of disparate communication protocols, the network and/or network cells interacting with the IoT devices can be configured to exchange data over any wireless network protocol such as Wi-Fi, ZigBee, Bluetooth, cellular, and/or the like. Accordingly, the network may be agnostic to the end devices, such as IoT devices, which may solve the interoperability challenge between endpoint connections. The network may be referred to as a multiple-input synchronous transfer (MIST) network in that the network utilizes network cells to receive multiple inputs from IoT devices and the network cells perform synchronous packet transfer via a master cell as described herein.

In order to handle the large volume of IoT devices, the network cells can be configured to search for other network cells in order to expand coverage of the network and/or capacity of the network to facilitate communication between IoT devices. In some aspects, the MIST network may beneficially offload data from a core network so that the large number of IoT data communications do not overwhelm the core network.

In many wireless networks, as the number of network devices increase, the probability of packet collisions may increase. With the larger number of IoT devices the packet loss due to collisions may occur. Implementations described herein allow a network to synchronize its communications so that packet collisions can be reduced or eliminated. This reduction of packet collisions may be beneficial in high assurance networks where packet loss may be unacceptable. Examples of high assurance networks may include high security areas such as government buildings, medical buildings, research facilities, and/or the like.

In some implementations, a large numbers of IoT devices communicating on a network may also reduce network bandwidth. The network synchronization described herein may allocate an entire network bandwidth to a single device to increase throughput for data communications to/from the single device. Additionally, poor network connections may also affect network performance and data throughput. The network formation described herein may beneficially optimize connections between network cells to increase packet transport efficiency.

In some implementations, network performance may be reduced when a network cell, cell tower, a base station, and/or the like fails, becomes disabled, is powered off, and/or the like. The networks described herein can be configured to detect dropped/lost network cells and reconfigure the network to compensate for the dropped/lost networks and to maintain communications to all functional network cells. The network implementations described herein may be configured to be self-forming, self-healing, and self-optimizing by dynamically reconfiguring the network cell connections based on the local traffic associated with the individual network cell.

FIG. 1 depicts a diagram of a network 100 for wireless synchronous communications, in accordance with some example implementations. As illustrated, the network 100 may include a master cell (MC) 110 configured to communicate with one or more user network cells such as network cells (NCs) 120A, 120B, and 120C, and a remote server 150. In some implementations the remote server 150 may include a cloud server and may communicate over the Internet, or other networks, with various third party servers, devices, applications, and/or the like. Radio frequency enabled devices (RFEDs) 180A and 180B may connect to one or more of the network cells 120A, 120B, and 120C and may be configured to generate and/or receive packets to/from other RFEDs in the network 100, the MC 110, RFEDs in a remote network, and/or the remote server 150. In some aspects, the RFEDs 180 may include IoT devices, cell phones, cellular modems, tablets, laptops, and/or the like.

In some aspects, the MC 110 functions as an interface between the distributed network components, such as the network cells 120A, 120B, and 120C, and the remote server 150. In some implementations, the MC 110 may be defined as the master in a master-slave relationship with the network cells 120. The MC 110 may be responsible for synchronizing all the network cells during network assembly and packet transport for a single or multiple sub-network configurations. The MC 110 may communication with the remote server 150 over a wireless network such as a Wi-Fi, a cellular, and/or another wireless network. The MC 110 may also provide the network single point interface to the remote server 150 for packet transfer to/from the remote server 150.

In some aspects, the MC 110 includes at least one processor that runs the network master firmware. The MC 110 may also include a memory. In some aspects, the memory may be external to the MC 110 if the chosen processor has insufficient internal memory for an application, such as, JPEG image files, high cell count, or high packet density. In some implementations, additional external serial or parallel RAM may be integrated, and is optional. The at least one processor may also be configured to process instructions from the memory accessible by the MC 110.

The MC 110 may also include a radio subsystem which may include the physical layer of the network 100 RF protocol. The radio subsystem may be configured to operate in any of the ISM license free bands. For example, the 400/900/2500 MHz bands with an RF power output within 10 mW (minimum) to 2000 mW (maximum), as per the relevant, country dependent, regulations. In some aspects, additional radios operating on different ISM bands/channels may operate concurrently on the MC 110 to increase network bandwidth for high packet density applications.

The MC 110 may also include a power interface/source which may be any type of battery, solar, or AC based power supply. Additionally, the MC 110 may include a remote server interface layer (RSIL). The RSIL may include the physical/software layer that enables bidirectional communication between the network 100 MC 110 and the remote server 150. The interface may include one or more of the following: i) a satellite communication transceiver module; ii) a cellular modem module; iii) a Wi-Fi module; iv) a Ethernet module, and/or the like.

In some aspects, the satellite communication transceiver module may be chosen to enable the master to communicate with the remote server port/socket via a satellite transmission. In some implementations, satellite transmissions may deliver high security but may be expensive. Satellite communication may be used if no cellular service is available via a cellular modem. In other aspects, the cellular modem module may be chosen to enable the MC 110 to communicate with the remoter server 150 via a local cellular provider. This may provide superior security over Wi-Fi/Ethernet implementations but may require a service contract with a cellular provider. In some implementations, the Wi-Fi module may be chosen to enable the MC 110 to communicate with the remote server 150 via an available wireless access point (AP). The Wi-Fi module may provide an inexpensive communication module. In some aspects, the Ethernet module may be chosen if an RJ-45 Ethernet socket is available and the MC 110 is in a fixed location.

In some implementations, the one or more modules may interface to a main master circuit board of the MC 110 via a daughter board socket. The socket footprint for all four module configurations may be identical to allow a single physical configuration for the main master printed circuit board. One or more of the RSIL communication modules may be inserted into the common footprint module socket to allow the master cell 110 to communicate with the remote server 150.

The network cells 120A, 120B, and 120C may be manually distributed throughout a spatial volume (e.g., building, factory, and/or the like) in a manner to produce minimally overlapping RF coverage of the spatial volume. In some aspects, network cells 120 may be defined as wireless apparatuses configured in a slave relationship to the master cell and further configured provide network service to devices communicating within the network. Once deployed and powered up, all NCs 120 may default to a mode which allows them to be integrated into the master network 100 via the single master cell (MC) 110, or into sub-networks via multiple sub-master cells (SMCs) as discussed further below. Similar to the MC 110, the network cells 120 may include one or more processors that run the network 100 firmware. The network cells 120 may also include a memory configured to store instructions and/or code for an application. The memory may also include an external memory in which additional external serial or parallel RAM may be integrated. The network cells may include a radio subsystem which may be the physical layer of the network RF protocol and may be configured to operate in any of the ISM license free bands. The network cells 120 may also include a power interface/source which may be any type of battery, solar, or AC based power supply.

The RFEDs 180 may include a network 100 compatible radio subsystem for communicating with the network cells 120. All packets generated by, or sent to, an RFED 180 are transported through the network 100. The radio subsystem may be integrated into the RFED 180 directly, both hardware and firmware, or in the form of a stand-alone module that plugs into the RFED 180 via an interface to a RFED 180 main board.

In some aspects, one or more of the RFEDs 180 may be configured to operate and/or communicate according to low-power techniques. For example, the RFEDs 180 may be configured to utilize less battery power, less processing power, and/or sleep states. In some implementations, at least a portion of the RFEDs 180 may be autonomous or semi-autonomous. For example, the RFEDs 180 may store configuration information for themselves and/or for other RFEDs 180. Thus, a user may be able to access one RFED 180 and change the configuration of other RFEDs 180, such as any other RFED 180 that is, for example, in a chain with the accessed RFED 180. Software modifications/updates may be provided to multiple RFEDs 180 in a similar manner.

In some aspects, an RFED 180 may store configurations for the complete active and/or passive set of connected RFEDs 180, which may be encrypted. For example, in a "smart home" setup, a device for climate may measure humidity, temperature, etc., and a device for controlling the heating/air-conditioning may have an active connection to the device for climate and act upon certain measurements. A passive connection may additionally or alternatively exist, where a sensor detects motion and provides an indication to a light switch to turn on a light. In some implementations, each of these devices in the smart home setup may belong to a single system and/or contain configuration information for the complete chain of RFEDs 180. However, some of the configuration data may be active (e.g., used by the interaction) and/or some of the configuration data may be passive (e.g., to keep the collective chain alive).

As shown in FIG. 1, the RFEDs 180A and 180B operating within the network 100 may utilize one of the NCs 120 as a wireless access point (AP) to gain access to the network 100 for packet transport to/from the RFED 180A and/or 180B from/to the remote server 150 via the network MC 110. Additionally, the RFEDs 180A and 180B may also exchange packets with multiple other RFEDs 180 operating in the local network 100, or a remote network implementing the same network protocol.

Before communication among the different network 100 devices, the network 100 undergoes a network creation process. The network 100 formation is initiated and synchronized by the MC 110. The MC 110 may attempt to connect directly to all network cells (NCs) 120 within acceptable RF range via a simple star connection. During manufacture, each NC 120 may be loaded with a unique 32 bit serial number or any other identifier. As illustrated in FIG. 1, the serial numbers for the network cells 120 are shown as cells A-C.

The MC 110 may assign each of the NCs 120 a unique network ID based on a layer, and a layer sequence of network assimilation. As shown throughout the description, the cell designation convention being used is: (NC)L-N, where L represents the layer where the cell is located, 0 to M, and N represents the sequential network ID based on the order of assimilation of the cell into the network, 1 to x.

All NCs 120 in the star connection to the MC 110 are defined as layer 0, being in direct RF connection to the MC 110. As illustrated in FIG. 1, the individual NCs 120A, 120B, and 120C in layer 0 are assigned a sequential network ID by the MC 110, (NC)0-1 through (NC)0-3, respectively, as shown. Once the MC 110 assembles all the available NCs 120A, 120B, and 120C into layer 0, each layer 0 NC 120A, 120B, and 120C may be sequentially enabled by the MC 110 to assemble a star network topology out of the remaining network cells in acceptable RF range to the individual NC 120. For example, each network cell 120A, 120B, and 120C may attempt to sequentially assemble a layer 1 star network topology.

Figure 2:
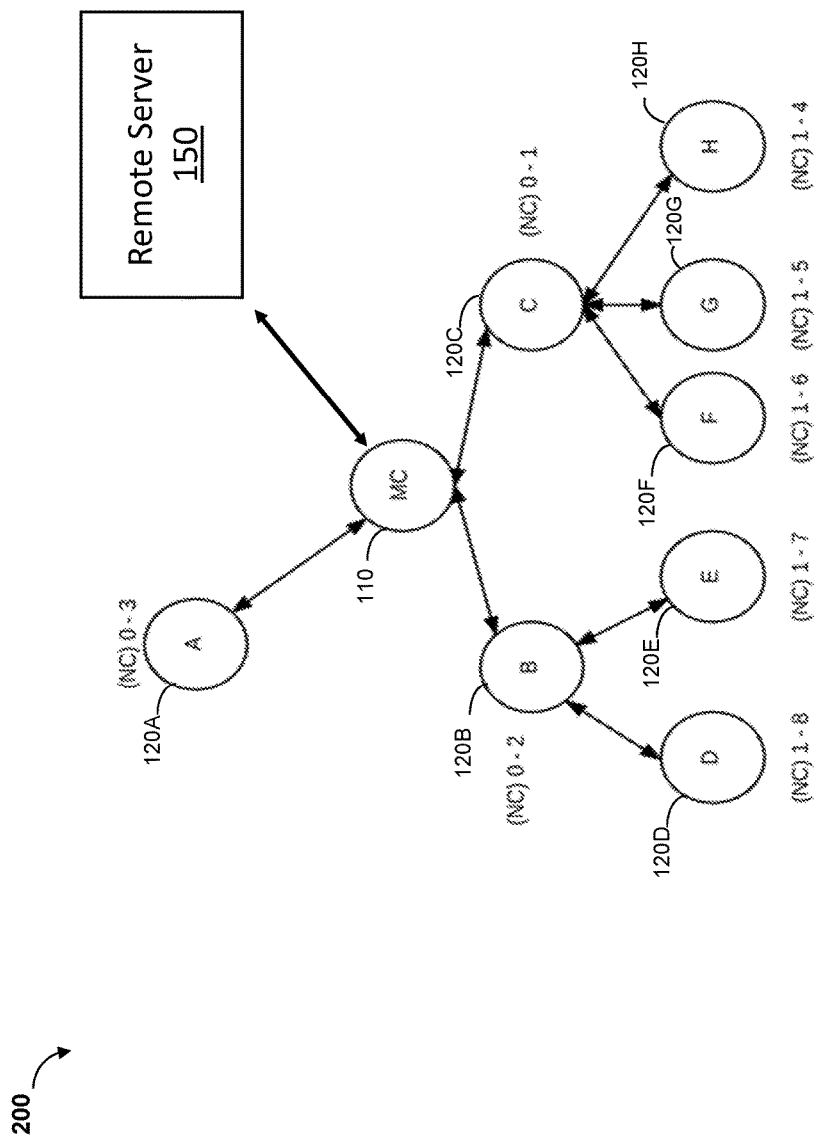
FIG. 2 depicts a diagram of a network for wireless synchronous communications, in accordance with some example implementations.

FIG. 2 is a diagram of a network 200 for wireless synchronous communications, in accordance with some example implementations. The network 200 illustrates an example implementation of the sequential layer 1 formation described above with respect to FIG. 1. As noted above, since network cell 120C was first assigned to the MC 110, as indicated by the (NC)0-1 designation, the MC 110 first enables NC 120C to assemble a star network topology out of the remaining network cells in an acceptable RF range of NC 120C. As shown, NC 120C assembles a three-cell layer 1 comprising NCs 120F, 120G, and 120H that are assigned the network IDs (NC)1-6, (NC)1-5, and (NC)1-4, respectively. In some aspects, NC 120B may then assemble a two-cell layer 1 comprising NC 120D and NC 120E that are assigned the network IDs (NC)1-8 and (NC)1-7, respectively. As shown in FIG. 2, the NC 120A has no additional network cells in an acceptable RF range and thus does not assemble an associated layer 1 star network.

In some aspects, the layer 1 cells are assigned a network ID by the MC 110 that is contiguous from the layer 0 cell network IDs. In this example, the last layer 0 cell NC 120A was assigned a network ID (NC)0-3 with the $1^{st}$ layer 1 network cell NC 120H assigned the network ID (NC)1-4. In some implementations, the network layer will indicate how many network cells (NCs) are involved in packet transfer to/from any given network cell (NC)L-N and the MC 110. Once all layer 0 network cells, such as NCs 120A, 120B, and 120C have assimilated all the available NCs 120 within acceptable RF range into their respective layer 1 star networks, the layer 1 NCs 120 may repeat the process.

Figure 3:
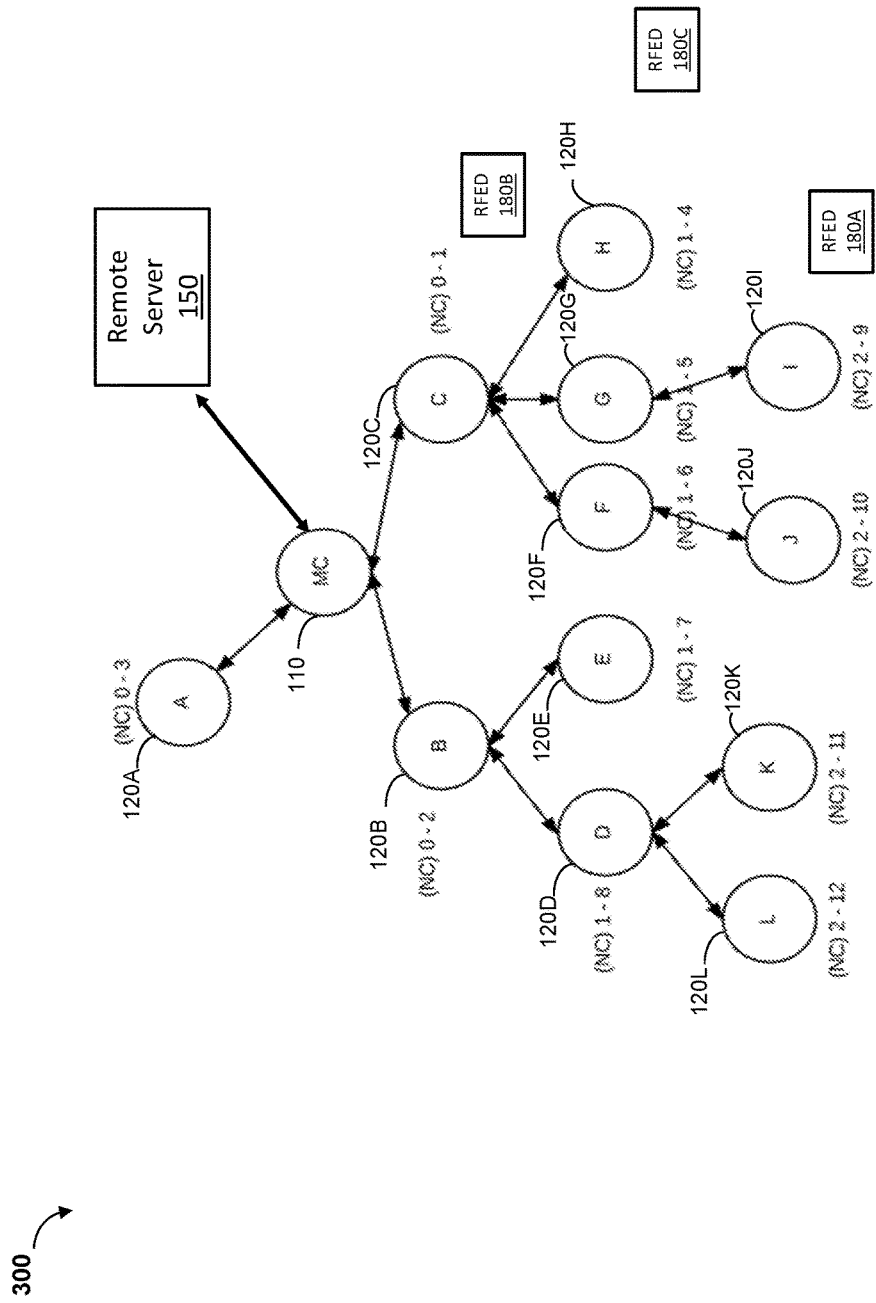
FIG. 3 depicts a diagram of a network for wireless synchronous communications, in accordance with some example implementations.

FIG. 3 is a diagram of a network 300 in which features consistent with the described subject matter may be implemented. The network 300 illustrates an example implementation of the sequential layer 2 formation described above with respect to FIG. 2. As shown in FIG. 3, NCs 120H and 120E have become terminal network cells with no layer 2 cells connected to them. The layer 1 network cells NC 120G, 120F, and 120D, each formed their respective layer 2 star networks in sequential order. As further shown in FIG. 3, NC 120I is within RF range of NC 120G and is assigned the network ID (NC)2-9. NC120J is within RF range of NC 120F and is assigned the network ID (NC)2-10 and NCs 120K and 120L are within RF range of NC 120D and are assigned the network IDs (NC)2-11 and (NC)2-12, respectively.

In some implementations, this process of layer formation may continue until all available network cells are assimilated into the network 300 by sequential layer formation. In the example of network 300, all 12 NCs 120 have been assimilated with NCs 120I, 120J, 120K, and 120L having network IDs (NC)2-9 through (NC)2-12, respectively, all becoming terminal cells in layer 2. The MC 110 is connected to each of the NCs 120 via a series of layer transfers. For example, communication from the MC 110 to the NC 120J with first travel to NC 120C, then to NC 120F, and finally to NC 120J. Radio frequency enabled devices (RFEDs) 180A, 180B, and 180C may connect to one or more of the network cells 120 of network 300 and may be configured to generate and/or receive packets to/from other RFEDs in the network 300, the MC 110, RFEDs in a remote network, and/or the remote server 150.

In order the assemble the networks 100, 200, and/or 300 as shown in FIGS. 1-3, the MC 110 and the respective network cells 120 partake in a communication exchange. One or more command packets may be communicated between the MC 110 and the network cells 120 in order to form the layered networks described herein.

In some aspects, the MC 110 and/or NCs 120 may generate and/or send a command packet to initiate a star formation, effectively forming a new N+1 layer star network. The MC 110 or NC 120 originating the command may become a gateway cell (GC) to all the network cells 120 that are formed into this unique N+1 layer. In some implementations, the command is a DISCOVER-SYNC packet and may include the network ID of the gateway cell (GC), its layer number, and an assigned network channel. Any NCs 120 receiving this command packet that were previously assimilated into the network may ignore it. In some aspects, only unconnected network cells 120 may respond to this DISCOVER-SYNC command packet on a default discover channel. The DISCOVER-SYNC packet may be used by the gateway cell to find NCs 120 within an RF communication range of the gateway cell.

Another packet used in the network formation may be a command packet responding to the DISCOVER-SYNC packet. This packet may be referred to as a NEW-CELL packet and includes a unique serial number of the unconnected network cell 120 that is responding to the DISCOVER-SYNC packet. This packet may be addressed to, and received by, the gateway cell (GC) in response to the GC sending the DISCOVER-SYNC packet.

In some aspects, the MC 110 is not the gateway cell (GC) and the NEW-CELL packet may be communicated to the MC 110 via a separate transfer command packet. The separate transfer command packet may be referred to as a NEW-CELL-TRANSFER packet. This packet is generated by a gateway cell (GC) to transfer the NEW-CELL packet to the MC 110 for layers 1 and higher. This packet may be transferred through the intermediate layers between the gateway cell (GC) and the MC 110.

Once the NEW-CELL, or NEW-CELL-TRANSFER, packet has been received, another packet may be generated to indicate that the unconnected network cell 120 transmitting the NEW-CELL packet has been added to a network registry by the MC 110. In some aspects, this packet may be referred to as a CONNECT packet which may be used by the MC 110 to assign the network cell 120 to a unique network ID and/or a network channel. This assigned network ID and/or network channel may be appended to the CONNECT packet and transferred back to the sending gateway cell (GC) or network cell 120. On receipt by the gateway cell (GC), the packet may be transferred to the connecting network cell 120 via its unique identifier, such as its serial number, to complete the assimilation. The packet may include the assigned network ID and network channel. The assigned network ID may be used by the network MC 110 to uniquely address a NC 120 in all future packet exchanges.

On receipt of the CONNECT packet, the connecting network cell 120 may assume the assigned network ID and may be configured to enter a reception mode on the assigned network channel. The network cell 120 may then fully assimilated into the network, such as network 100, 200, and/or 300 at the assigned layer and network ID.

In some aspects, the MC 110 may send a packet to the network cells to indicate that the network cells 120 may begin searching for other network cells within their RF range to help build the network. In some implementations, the MC 110 may send a CLEAR-TO-SEND packet sequentially to the NCs 120 so that each NC 120 may initiate a DISCOVER-SYNC packet. The transmitting NC 120 may then become a gateway cell (GC) and initiates another sequential star network cell 120 formation. This command from the MC 110 may initiate all layer 1, and higher, star network formation. For example, since NC 120C is the first assigned layer 0 network cell, after all the layer 0 NCs 120 have been assimilated into the network, the MC 110 may transmit the CLEAR-TO-SEND packet to NC 120C so that NC 120C may begin searching for other unconnected NCs 120 within its RF range to add to the network. The CLEAR-TO-SEND command packet may also be used as the primary network synchronization command and for packet transfer control.

Network layer formation generally falls into one of two groups: layer 0, and higher layers, 1 through M. Layer 0 formation may be unique in that layer 0 is the only layer that is in direct RF communication with the network MC 110. All other layers will utilize intermediate network cell(s) (NC) 120 to transfer packets to/from the network MC 110.

Figure 4A:
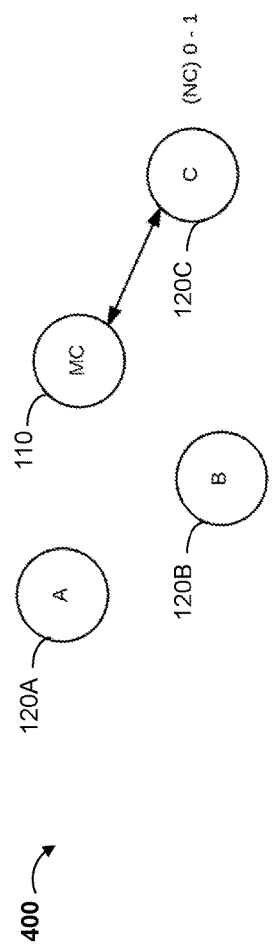
FIG. 4A depicts a diagram of a master cell connecting a network cell to a network, in accordance with some example implementations.

FIGS. 4A-6B illustrate an example of a layer 0 formation for the network 100 in FIG. 1. FIG. 4A depicts a diagram 400 of the MC 110 and connecting the NC 120A to a network, in accordance with some example implementations. As described above, the MC 110 may begin forming a network by attempting to connect directly to all NCs 120 within an acceptable RF range such as NCs 120A, 120B, and 120C, via a simple star connection. In some aspects, the NCs 120A, 120B, and 120C may be configured in a receive mode on a default "discover" channel. In the receive mode, the NCs 120A, 120B, and 120C may be configured to detect a communication packet from the MC 110. As noted above, the NC 120C was the first NC 120 connected to the network 100. As shown in FIG. 4A, the MC 110 communicates with the NC 120C to add the NC 120C to the network.

Figure 4B:
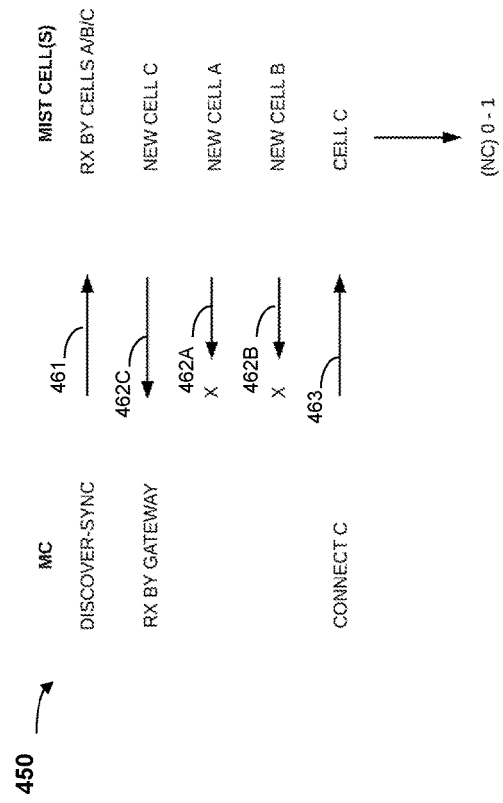
FIG. 4B depicts an example of a communication exchange between the master cell and the network cells of FIG. 4A, in accordance with some example implementations.

FIG. 4B depicts an example of a communication exchange 450 between the MC 110 and the NCs 120A, 120B, and 120C of FIG. 4A, in accordance with some example implementations. As shown in FIG. 4B, the MC 110 begins the network formation by transmitting a first command packet 461 to detect all NCs 120 within an acceptable RF range. In some aspects, the first command packet 461 includes a DISCOVER-SYNC packet. The MC 110 may transmit the DISCOVER-SYNC packet on the discover channel and the NCs 120A, 120B, and 120C may receive the DISCOVER-SYNC packet. In some implementations, the DISCOVER-SYNC packet includes the MC 110 network ID to allow the packets from the responding unconnected network cells 120A, 120B, and 120C to be addressed to the MC 110. In the layer 1-M formations, the DISCOVER-SYNC packet may include the respective gateway cell (GC) network ID and/or an assigned network channel to allow the packets from the responding unconnected NCs 120 to be addressed only to the sending gateway cell (GC) and/or on the assigned network channel.

In response to receiving the first command packet 461, the NCs 120A, 120B, and 120C may transmit a second command packet 462 to the MC 110 identifying the responding NC 120. In some aspects, the second command packet 462 includes a NEW-CELL response packet. The NEW-CELL response packet may include an identifier of the NC 120. In some implementations, the identifier includes a serial number of the NC 120 stored in a memory of the NC 120 during manufacture. In some aspects, the serial number may include a 32 unique identifier and may also be used by the NC 120 as its temporary network ID which may be later replaced by a network ID assigned by the MC 110.

As shown in FIG. 4B, each of the NCs 120A, 120B, and 120C transmit their respective second command packet 462 to the MC 110. Before transmitting, each of the NCs 120A, 120B, and 120C may implement a random delay to reduce the probability of packet collisions during transmission. In some aspects, after transmitting, each of the NCs 120A, 120B, and 120C may return to the receive mode to detect further communication from the MC 110. In the example of 4B, the NC 120C has the shortest random delay and transmits its second packet 462C first to the MC 110. Although unconnected cells 120B, and 120C also responded with their packets 462B and 462A, respectively, they were both discarded due to the longer random delay.

In response to receiving the packet 462C, the MC 110 may transmit a third command packet 463 to the NC 120C. Additionally, in response to receiving the packet 462C, the MC 110 may store the identifier of the NC 120C, an assigned network ID for the NC 120C, a channel for the NC 120C, and/or other information associated with the NC 120C included in the packet 462C in a network registry. In some implementations, the registry is stored locally at the MC 110 or in an external database. In some aspects, the third command packet 463 includes a CONNECT packet assigning the network cell 120C to a unique network ID, such as (NC)0-1, and/or a network channel. In response to receiving the third command packet 463, the NC 120C may assume the assigned network ID, (NC)0-1, and return to the receive mode on the assigned network channel.

Figure 5A:
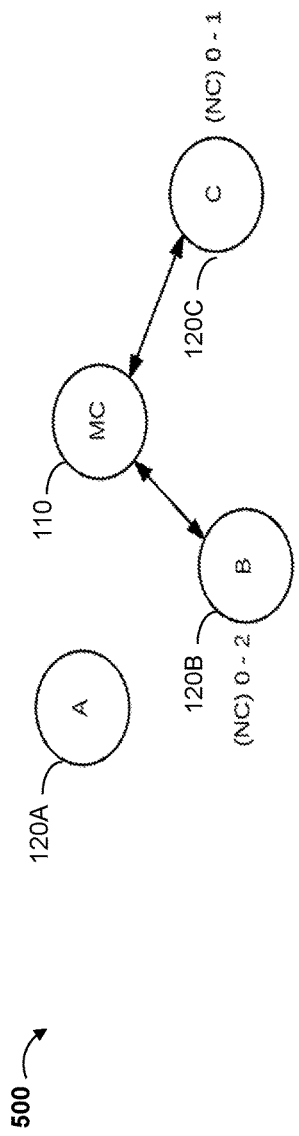
FIG. 5A depicts a diagram of a master cell connecting a network cell to a network, in accordance with some example implementations.

FIG. 5A is a diagram 500 of the MC 110 and connecting the NC 120B to a network, in accordance with some example implementations. After the MC 110 has connected the NC 120A to the network, the MC 110 may repeat the process of detecting unconnected NCs 120 within RF range of the MC 110. As noted above and shown in FIG. 5A, the NC 120B is the next NC 120 to connect to the MC 110 via a communication exchange.

Figure 5B:
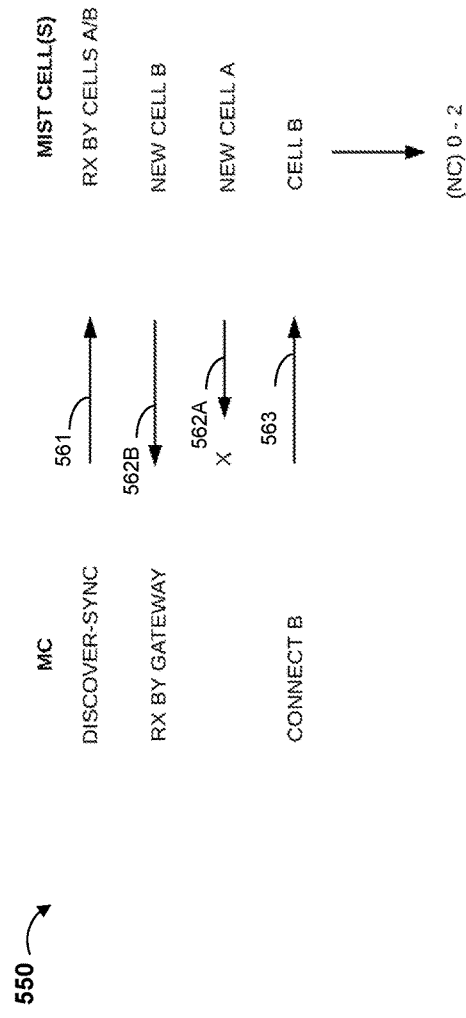
FIG. 5B depicts an example of a communication exchange between the master cell and the network cells of FIG. 5A, in accordance with some example implementations.

FIG. 5B depicts an example of a communication exchange 550 between the MC 110 and the NCs 120B, and 120A of FIG. 5A, in accordance with some example implementations. As shown in FIG. 5B, the MC 110 begins the network formation by transmitting a first command packet 561 to detect all NCs 120 within an acceptable RF range. In some aspects, the first command packet 561 includes a DISCOVER-SYNC packet. The MC 110 may transmit the DISCOVER-SYNC packet on the discover channel and the NCs 120C, 120B, and 120A may receive the DISCOVER-SYNC packet 561. In some aspects, the NC 120C may ignore the packet 561 because it is already connected to the network.

In response to receiving the first command packet 561, the NCs 120B and 120A may transmit a second command packet 562 to the MC 110 identifying the responding NC 120. In some aspects, the second command packet 562 includes a NEW-CELL response packet. As shown in FIG. 5B, each of the NCs 120B and 120A transmit their respective second command packet 562 to the MC 110. Before transmitting, each of the NCs 120B and 120A may implement a random delay. In the example of 5B, the NC 120B has the shortest random delay and transmits its second packet 562B first to the MC 110. As shown, the NC 120A packet 562A is discarded. In response to receiving the packet 562B, the MC 110 may enter the NC 120B identifier and information into the registry and transmit a third command packet 563 to the NC 120B. In some aspects, the third command packet 463 includes a CONNECT packet assigning the network cell 120B to a unique network ID, such as (NC)0-2, and/or a network channel. In response to receiving the third command packet 563, the NC 120B may assume the assigned network ID, (NC)0-2, and return to the receive mode on the assigned network channel.

Figure 6A:
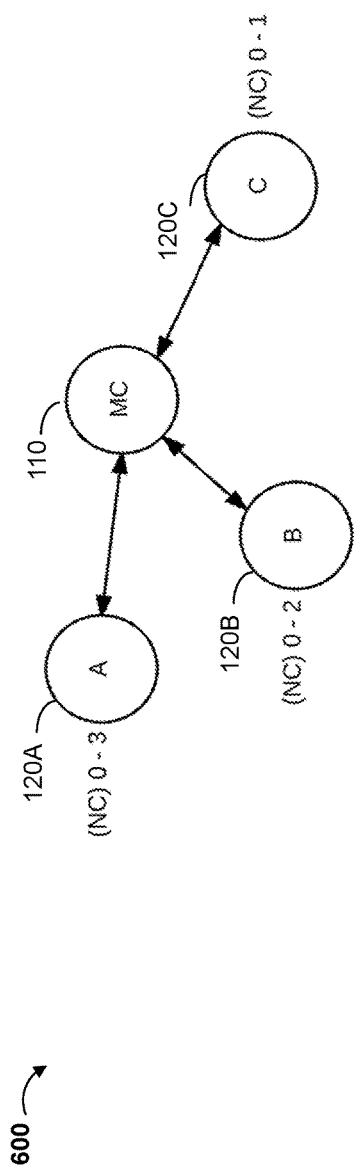
FIG. 6A depicts a diagram of a master cell connecting a network cell to a network, in accordance with some example implementations.

FIG. 6A depicts a diagram 600 of the MC 110 and connecting the NC 120A to a network, in accordance with some example implementations. After the MC 110 has connected the NC 120C and 120B to the network, the MC 110 may repeat the process of detecting unconnected NCs 120 within RF range of the MC 110. As noted above and shown in FIG. 6A, the NC 120A is the next NC 120 to connect to the MC 110 via a communication exchange.

Figure 6B:
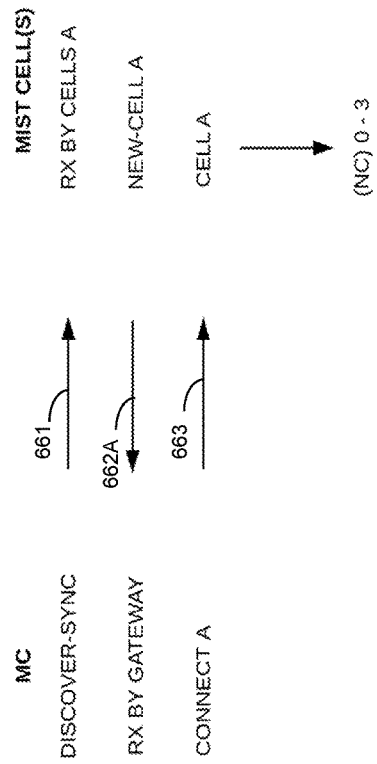
FIG. 6B depicts an example of a communication exchange between the master cell and the network cells of FIG. 6A, in accordance with some example implementations.

FIG. 6B depicts an example of a communication exchange 650 between the MC 110 and the NCs 120A of FIG. 6A, in accordance with some example implementations. As shown in FIG. 6B, the MC 110 begins the adding another NC 120 by transmitting a first command packet 661 to detect all NCs 120 within an acceptable RF range. In some aspects, the first command packet 661 includes a DISCOVER-SYNC packet. The NC 120A receive the DISCOVER-SYNC packet. In some aspects, the NCs 120C and 120B may ignore the packet 661 because it is already connected to the network.

In response to receiving the first command packet 661, the NC 120A may transmit a second command packet 662 to the MC 110 identifying itself. In some aspects, the second command packet 662 includes a NEW-CELL response packet. As shown in FIG. 6B, NC 120A transmits its second command packet 662A to the MC 110. In response to receiving the packet 662A, the MC 110 may enter the NC 120A identifier and information into the registry and transmit a third command packet 663 to the NC 120A. In some aspects, the third command packet 463 includes a CONNECT packet assigning the network cell 120A to a unique network ID, such as (NC)0-3, and/or a network channel. In response to receiving the third command packet 663, the NC 120A may assume the assigned network ID, (NC)0-3, and return to the receive mode on the assigned network channel.

After NC 120A has been connected, the layer 0 has been completed. In some aspects, the MC 110 may transmit a first command packet such as the DISCOVER-SYNC packet and fail to receive a response from any NCs 120 for a certain time period. The MC 110 may determine there are no more NCs 120 within its RF range and the MC 110 may then instruct the NCs 120A, 120B, and 120C to begin the layer 1 network formation. In some aspects, the layer 1 formation is sequential in the order of the layer 0 formation.

Figure 7A:
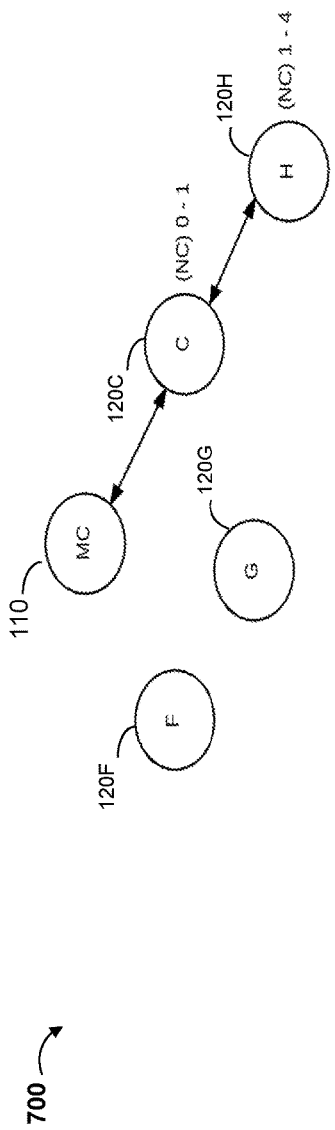
FIG. 7A depicts a diagram of a network cell connecting another network cell to a network, in accordance with some example implementations.

FIGS. 7A-9B illustrate an example of a layer 1 formation for the NC 120C with reference to FIG. 2. FIG. 7A depicts a diagram 700 of the NC 120C connecting the NC 120H to a network, in accordance with some example implementations. After the MC 110 has completed the layer 0 formation, the MC 110 coordinates the sequential formation of the multiple layer 1 star network via a command packet. In some aspects, the command packet includes a CLEAR-TO-SEND (CTS) packet. The assimilation process for layer 1 through M may be more complex than layer 0 layer formation. This added complexity is due to the gateway cells (GC) transferring the command packets, such as NEW-CELL packets, to the MC 110 for inclusion into the network registry and assignment of the network ID/channel. As noted above and shown in FIG. 7A, the NC 120H is the next NC 120 to connect to the network via a communication exchange, while the NCs 120F and 120G are within an RF range of the NC 120C.

Figure 7B:
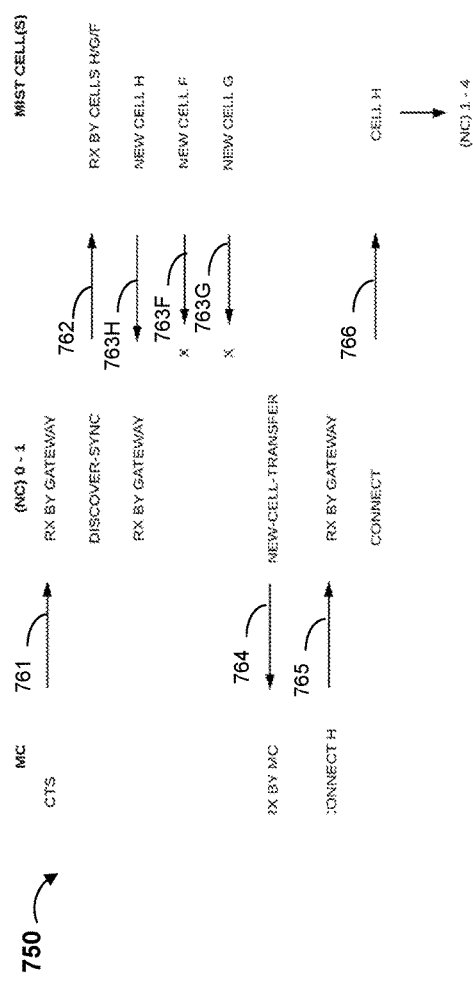
FIG. 7B depicts an example of a communication exchange between the master cell and the network cells of FIG. 7A, in accordance with some example implementations.

FIG. 7B depicts an example of a communication exchange 750 between the MC 110, a gateway cell such as NC 120C, and the NCs 120H, 120G, and 120F of FIG. 7A, in accordance with some example implementations. As shown in FIG. 7B, the MC 110 begins the layer 1 formation by transmitting a first command packet 761 to instruct the NC 120C to start detecting unconnected NCs 120 within RF range of the NC 120C. In some aspects, the first command packet 761 includes a CLEAR-TO-SEND (CTS) packet addressed to the NC 120C. The MC 110 may coordinate the layer 1, and any subsequent layer, formation by sending one or more packets 761. In some aspects, the MC 110 may initiate the network cell layer formation process by setting a flag in the CTS packet 761. In some aspects, the flag comprises an discover-sync flag that instructs or triggers the receiving NC 120 to transmit a packet, such as the discover-sync packet described below, to detect and/or connect other NCs 120 within range of the transmitting NC 120.

In response to receiving the first command packet 761, the NC 120C may transmit a second command packet 762 to the unconnected NCs 120 within the RF range of the NC 120C. In some aspects, the second command packet 762 includes a DISCOVER-SYNC packet. The NC 120C may transmit the DISCOVER-SYNC packet on the discover channel and the NCs 120H, 120G, and 120F may receive the DISCOVER-SYNC packet.

In response to receiving the second command packet 762, the NCs 120H, 120G, and 120F may transmit a third command packet 763 to the NC 120C identifying the responding NC 120. In some aspects, the third command packet 763 includes a NEW-CELL packet. As shown in FIG. 7B, each of the NCs 120H, 120G, and 120F transmit their respective third command packet 763 to the NC 120C. Before transmitting, each of the NCs 120H, 120G, and 120F may implement a random delay. In the example of 7B, the NC 120H has the shortest random delay and transmits its second packet 763H first to the NC 120C. As shown, the NCs 120F and 120G packets 763F and 763G are discarded. In response to receiving the packet 763H, the NC 120C, the gateway cell (GC), may transfer the packet 763H to the MC 110 using a fourth command packet 764. In some aspects, the fourth command packet 764 includes a NEW-CELL-TRANSFER packet.

In response to receiving the fourth command packet 764, the MC 110 may enter the NC 120H identifier and information into the registry and transmit a fifth command packet 765 to the NC 120C. In some aspects, the fifth command packet 765 includes a CONNECT packet assigning the network cell 120H to a unique network ID, such as (NC)1-4, and/or a network channel. In response to receiving the fifth command packet 765, the NC 120C may transfer the packet 765 by transmitting a sixth command packet 766 to the NC 120H. In some aspects, the sixth command packet 766 includes a CONNECT packet. In response to receiving the sixth command packet 766, the NC 120H may assume the assigned network ID, (NC)1-4, and return to the receive mode on the assigned network channel.

FIG. 8A depicts a diagram 800 of the NC 120C connecting the NC 120G to a network, in accordance with some example implementations. After the MC 110 has assigned NC 120H a network ID and connected NC 120H to the network, the MC 110 may coordinate adding a new network cell to the network. As noted above and shown in FIG. 8A, the NC 120G is the next NC 120 to connect to the network via a communication exchange.

FIG. 8B depicts an example of a communication exchange 850 between the MC 110, a gateway cell such as NC 120C, and the NCs 120G and 120F of FIG. 8A, in accordance with some example implementations. In some aspects and as shown in FIG. 8B, in response to transmitting the CONNECT command packet 766 to NC 120H and assimilating NC 120H to the network, the NC 120C may transmit a second command packet 862 to the unconnected NCs 120 within the RF range of the NC 120C. In some aspects, the second command packet 862 includes a DISCOVER-SYNC packet. In some aspects, the NCs 120G and 120F may receive the DISCOVER-SYNC packet on the discover channel. The NC 120H may receive the second command packet 862 but ignores the packet 862 since it is already connected to the network.

In response to receiving the second command packet 862, the NCs 120G and 120F may transmit a third command packet 863 to the NC 120C identifying the responding NC 120. In some aspects, the third command packet 863 includes a NEW-CELL packet. As shown in FIG. 8B, each of the NCs 120G and 120F transmit their respective third command packet 863 to the NC 120C. In the example of 8B, the NC 120G has the shortest random delay and transmits its second packet 863G first to the NC 120C. As shown, the packet 863F is discarded. In response to receiving the packet 863G, the NC 120C, the gateway cell (GC), may transfer the packet 863G to the MC 110 using a fourth command packet 864. In some aspects, the fourth command packet 864 includes a NEW-CELL-TRANSFER packet.

In response to receiving the fourth command packet 864, the MC 110 may enter the NC 120G identifier and information into the registry and transmit a fifth command packet 865 to the NC 120C. In some aspects, the fifth command packet 865 includes a CONNECT packet assigning the network cell 120G to a unique network ID, such as (NC)1-6, and/or a network channel. In response to receiving the fifth command packet 865, the NC 120C may transfer the packet 865 by transmitting a sixth command packet 866 to the NC 120G. In some aspects, the sixth command packet 866 includes a CONNECT packet. In response to receiving the sixth command packet 866, the NC 120G may assume the assigned network ID, (NC)1-6, and return to the receive mode on the assigned network channel.

Figure 9A:
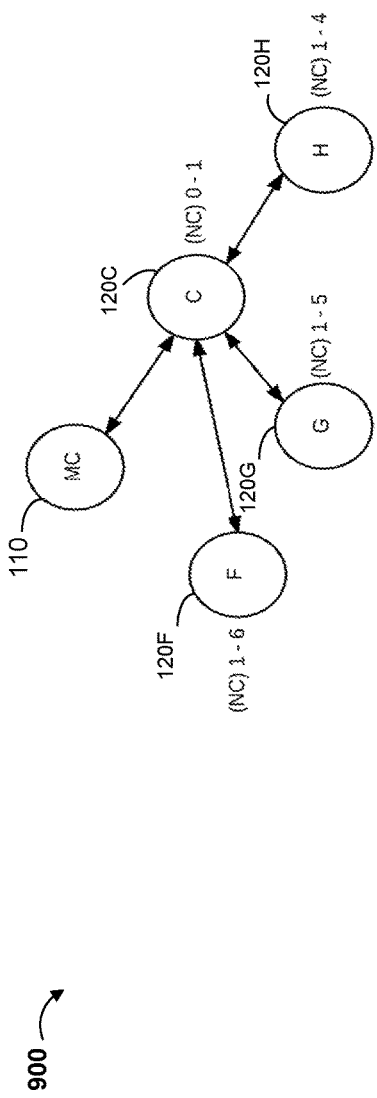
FIG. 9A depicts a diagram of a network cell connecting another network cell to a network, in accordance with some example implementations.

FIG. 9A depicts a diagram 900 of the NC 120C connecting the NC 120F to a network, in accordance with some example implementations. After the MC 110 has assigned NC 120G a network ID and connected NC 120G to the network, the NC 120C may coordinate adding another NC 120 to the network. As noted above and shown in FIG. 9A, the NC 120F may be the next NC 120 to connect to the network via a communication exchange.

Figure 9B:
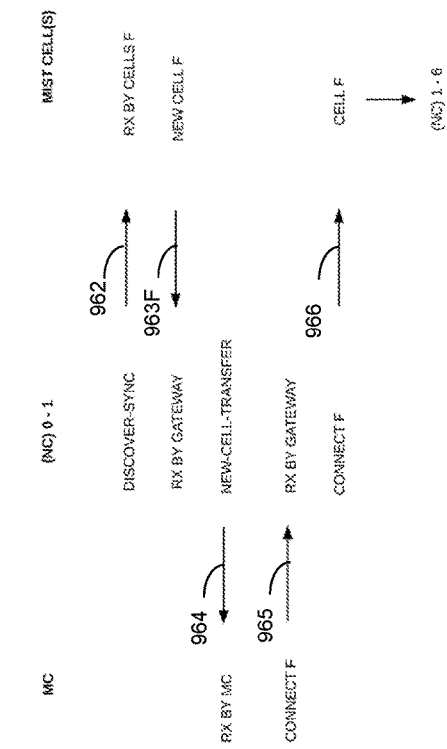
FIG. 9B depicts an example of a communication exchange between the master cell and the network cells of FIG. 9A, in accordance with some example implementations.

FIG. 9B depicts an example of a communication exchange 950 between the MC 110, a gateway cell such as NC 120C and NC 120F of FIG. 9A, in accordance with some example implementations. As shown in FIG. 9B, NC 120C continues the layer 1 formation after transmitting the CONNECT packet 866 destined for NC 120G.

The NC 120C may transmit a second command packet 962 to the unconnected NCs 120 within the RF range of the NC 120C. In some aspects, the second command packet 962 includes a DISCOVER-SYNC packet. In some aspects, the NC 120F may receive the DISCOVER-SYNC packet on the discover channel. The NCs 120G and 120H may receive the second command packet 962 but ignore the packet 962 since they are already connected to the network.

In response to receiving the second command packet 962, the NC 120F may transmit a third command packet 963 to the NC 120C identifying the responding NC 120. In some aspects, the third command packet 963 includes a NEW-CELL packet. As shown in FIG. 9B, NC 120F transmits the third command packet 963F to the NC 120C. In response to receiving the packet 963F, the NC 120C, the gateway cell (GC), may transfer the packet 963F to the MC 110 using a fourth command packet 964. In some aspects, the fourth command packet 964 includes a NEW-CELL-TRANSFER packet.

After NC 120F has been connected to the network, NC 120C has completed its layer 1 star network. In some aspects, the MC 110 may instruct the other layer 0 NCs 120B and 120A to execute an identical sequence to add unconnected cells and complete their respective layer 1 start network. The completed layer 0 and layer 1 sequences are shown as network 200 in FIG. 2. Network layer 2, and higher formation may be identical to layer 1 with the command packets, such as NEW-CELL, NEW-CELL-TRANSFER, and CONNECT packets, now being transferred through multiple intermediate network layers between the MC 110 and enabled gateway cells (GCs). In some implementations, the process of layer formation will continue until all available unconnected NCs 120 are assimilated into a series of tree/star network topologies, by the associated gateway cell (GC). The number of layers, and the number of NCs 120 per layer, may be dependent on the spatial distribution of the NCs 120.

In some implementations, the network assimilation sequence described herein, such as in FIGS. 4A-9B, may result in a less than optimal RF signal strength between the gateway cell (GC) and the NCs 120 assimilated into the associated star network.

Figure 10:
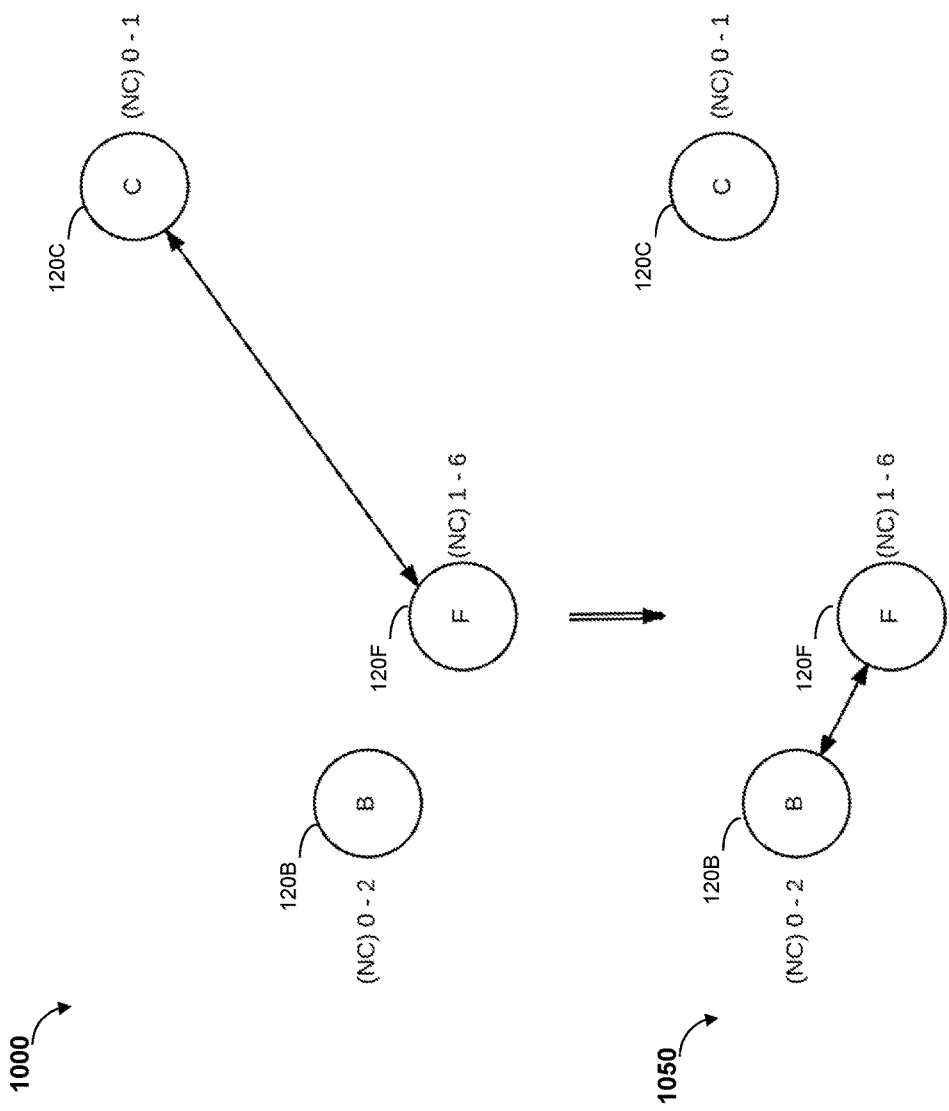
FIG. 10 depicts a diagram of an optimization process between network cells of a network, in accordance with some example implementations.

FIG. 10 depicts a diagram 1000 of an less than optimal connection between the NC 120C and the NC 120F, in accordance with some example implementations. As shown in FIG. 10, although NC 120C is further from NC 120F than NC 120B, NC 120C will be enabled to execute its star formation before NC 120B and therefore will connect with NC 120F, as described above. However, since NC 120B is physically closer to NC 120F it may have a higher received signal strength indication (RSSI) and it may be desirable that NC 120F be connected to NC 120B instead of NC 120C.

In some implementations, after the completion of the respective gateway cell (GC) assimilation process, a command packet may generated by each gateway cell (GC) on the assigned network channel to optimize the network. In some aspects, this packet may be referred to as an OPTIMIZE packet. The MC 110 may coordinate or trigger the optimize process by setting a flag, such as an optimize flag, in a command packet, such as a CTS packet. In response to receiving the packet with the optimize flag set, the GC may transmit the OPTIMIZE packet. The OPTIMIZE packet transmitted by each GC may be received by previously assimilated NCs 120 and not by unconnected NCs 120. This may be because the assimilated NCs 120 receive the OPTIMIZE on an assigned network channel and the unassigned NCs 120 listen for packets only on the discovery channel. In some aspects, if the RSSI of the OPTIMIZE packet is greater than an RSSI associated with the current gateway cell (GC) of the receiving NC 120, the NC 120 may re-associate with the GC transmitting the OPTIMIZE packet. The re-association may be governed by a rule set to control the optimization process. For example, the rule set may include a rule that for the re-association to occur, the transmitting gateway cell (GC) RSSI should be greater than the current gateway (GC) RSSI by at least a threshold amount, such as 10 dBm. In some aspects, if the difference between the transmitting GC RSSI and the current GC RSSI satisfies the threshold, the re-association may proceed. The rule set may also indicate that the transmitting GC be in the same layer as the current GC. Additionally, the rule set may indicate that the receiving NC 120 may not be in layer 0 since the MC 110 is the GC of layer 0.

In some implementations, if the above conditions are satisfied, a NC 120 receiving the OPTIMIZE packet may transmit a command packet to the MC 110 via the transmitting GC to indicate the re-association to the GC with the higher RSSI. In some aspects, the command packet transmitted for re-association may be an UPGRADE packet including information regarding the re-association of the NC 120 to the transmitting GC with the higher RSSI. In some implementations, as the UPGRADE packet propagates to the MC 110 from the sending NC 120, each gateway cell that passes the packet up the layers of the network may update the network registry to reflect the new gateway association. The MC 110 may also update its registry on reception of the UPGRADE packet. In some aspects, the MC 110 may send a report to the remote server 150 application to allow the network map to be updated.

In the example of FIG. 10, all connected NCs 120 may transmit an OPTIMIZE packet upon receiving a CTS command packet, such as packet 761. In some aspects, the connected NCs 120 transmit the OPTIMIZE packet if an optimize flag is set, via the MC 110, in the CTS packet 761. In response to receiving the OPTIMIZE packet, the NC 120F may transmit an UPGRADE packet to the NC 120B for the NC 120B to transmit to the MC 110. In some implementations, as the UPGRADE packet propagates thru the intermediate layers, the registries of the transferring NCs 120, such as NC 120B, and MC 110, may be updated to reflect the new gateway cell (NC 120B) association to the upgrading network cell (NC 120F) for future packet transfer. Diagram 1050 illustrates the re-association of NC 120F with the GC, NC 120B The optimize/upgrade sequence described herein may help improve RSSI for each NC 120 distribution which may improve overall network bandwidth. In some aspects, upon receiving the UPGRADE packet, the MC 110 may generate and transmit a report to a server application, such as an application on the remote server 150, to allow an update on the network map.

After network formation and network optimization, the network may operate and facilitate communication between the different network devices. In some aspects, all packets communicated within the network are synchronized by the MC 110. Network packet synchronization may be accomplished by a simple "round robin" network poll executed by the MC 110. The network poll period may be based on a required network refresh rate of a server application. At the beginning of each poll period, the MC 110 sequentially enables each of the NCs 120 to transmit packets to the MC 110, one cell at a time. Packets transmitted from the RFEDs 180 and/or the NCs 120 to the MC 110 may be referred to as afferent transport (AT) packets. Packets transmitted from the MC 110 to the NCs 120 and/or the RFEDs 180 may be referred to as efferent transport (ET) packets.

In order to communicate with other RFEDs 180, the MC 110, and/or other network devices, an RFED 180 within a NC 120 range may transmit packets to the NC 120. Instead of immediately transmitting these packets to the MC 110, the NC 120 may be configured to store these packets from the RFEDs 180 within their cell range in a cell buffer until the NC 120 is enabled by the MC 110 to transmit the packets. In some aspects, the cell buffer includes a first-in-first-out (FIFO) buffer, a last-in-first-out (LIFO) buffer, or any other storage buffer.

In some aspects, when a NC 120 is enabled, it may begin uploading the packets saved to the its buffer, as well as any required AT control packets. The enabled NC 120 may be allotted the full network bandwidth by the MC 110 while it is enabled to transmit AT packets. In some implementations, the allotted full network bandwidth may NCs 120 to transfer high definition (HD) JPEG, or other image format, images received from the RFEDs 180 at a low frame rate, such as 10 frames per second (fps). In some aspects, the NCs 120 may dynamically increase the data rate for the JPEG, or any other file, transfer. The upper limit of the data rate may be determined by the RSSI between the sending NC 120 and the associated gateway cell. In some aspects, the data rate may change the upload path from the NC 120, to the gateway cell, and all the way to the MC 110.

During this period, all the other NCs 120 may remain in receive mode and save any asynchronously received packets from local RFEDs 180 to their respective cell buffer. Each NC 120 may be sequentially enabled by the MC 110 to upload their respective buffer upon receipt of a command packet indicating that the respective NC 120 is enabled to begin uploading its buffer. In some aspects, the command packet includes a CTS packet from the MC 110 to the NC 120. In some implementations, the enabling sequence may be determined by the contiguous network cell IDs assigned during assembly.

This synchronized communication control may beneficially allow maximum throughput on the fully allotted network bandwidth for each packet transfer on the network. This control scheme may also result in zero packet loss by collision regardless of packet density due to only one NC 120 being enabled to transmit at any given time. Accordingly, the MC 110-controlled synchronized communications in the network 100, 200, and/or 300 described herein provide a high assurance network where packet drops are zero or minimal.

Packet transfer in the networks 100, 200, 300, and/or the like generally involve four categories of packet transfer. A first category may include synchronous packet transfer from the MC 110 to a NC 120, which may be described as efferent transport (ET). The ET packets may originate from either the remote server 150 or the MC 110. A second category of packet transfer may include synchronous packet transfer from a NC 120 to the MC 110, which be described as afferent transport (AT). The AT packets may originate from a NC 120. A third category may include synchronous packet transfer from a NC 120 to an RFED 180, which may also be described as ET packets. A fourth category may include asynchronous packet transfer to a NC 120 from an RFED 180. These packets are not synchronized to the network and may ultimately be transported as AT packets to the MC 110 from the NC 120 using the second category of packet transfer.

For the first category of packet transfer, during network assembly, each NC 120 may create a unique memory map of the local NCs 120. This network map allows the current network cell 120 to direct the packet to the next N+1 network layer on route to the addressed NC 120. The ET packet is effectively passed from layer N to layer N+1 until it reaches the addressed network cell 120 in the destination layer.

Figure 11:
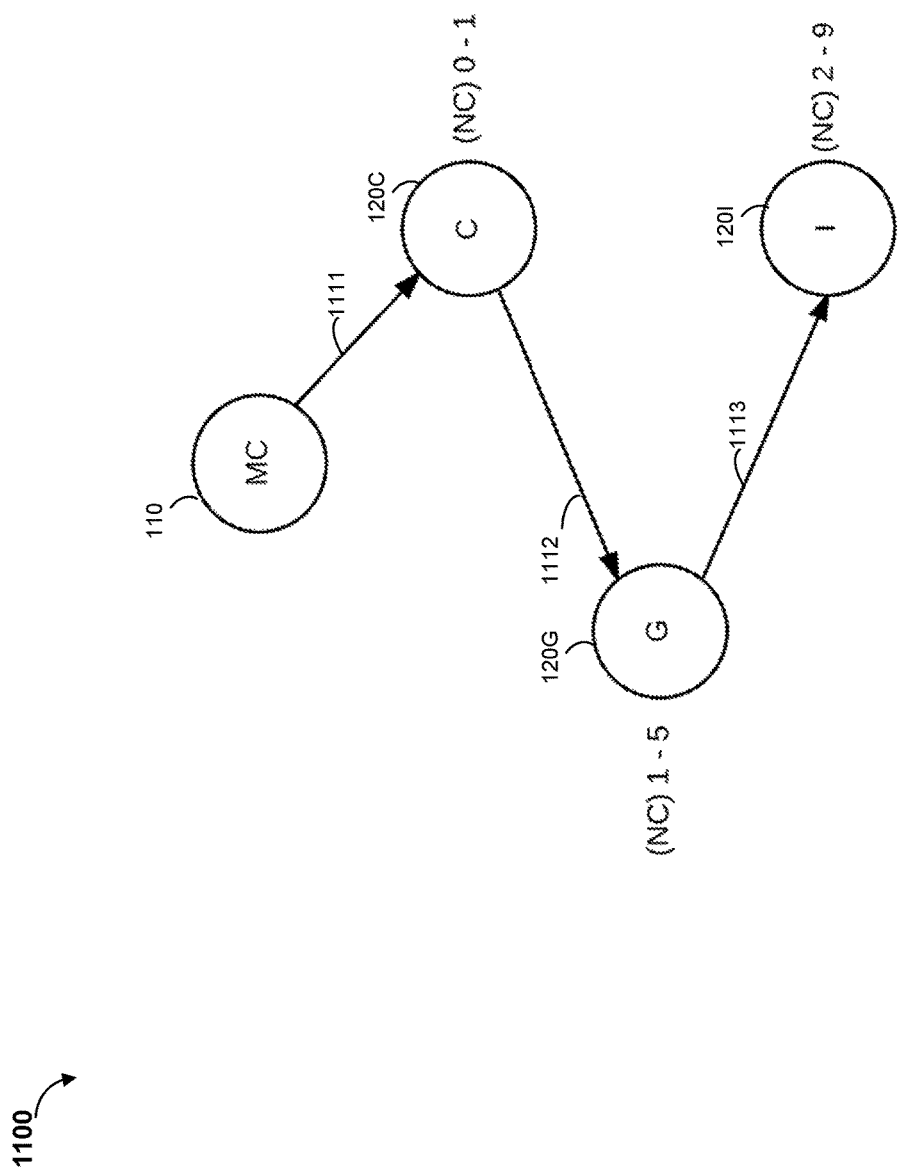
FIG. 11 depicts a diagram of a subset of network cells of the network of FIG. 3 in communication with the master cell, in accordance with some example implementations.

FIG. 11 is a diagram 1100 of a subset of network cells 120 of network 300 of FIG. 3 in communication with the MC 110, in accordance with some example implementations. As shown in FIG. 11, a packet originates at the MC 110 and is transmitted first in transmission 1111 to the NC 120C, which then transfers the packet to the NC 120G in transmission 1112, which further transfers the packet to NC 120I in transmission 1113, which is the destination cell in layer 2. The number of required packet transfers is equal to the layer of the destination cell. In this example, the destination cell NC 120I was in layer 2, requiring two transfers. In some aspects, all NCs 120 in any given layer, may require the same number of packet transfers regardless of where it is in the network. AT packet transport may not require the NCs 120 to incorporate an overall network map of any kind, as required by a mesh-based network topology, such as Zigbee. Only the network address of the (GC) is required for AT packet transfer to the MC 110.

Figure 12:
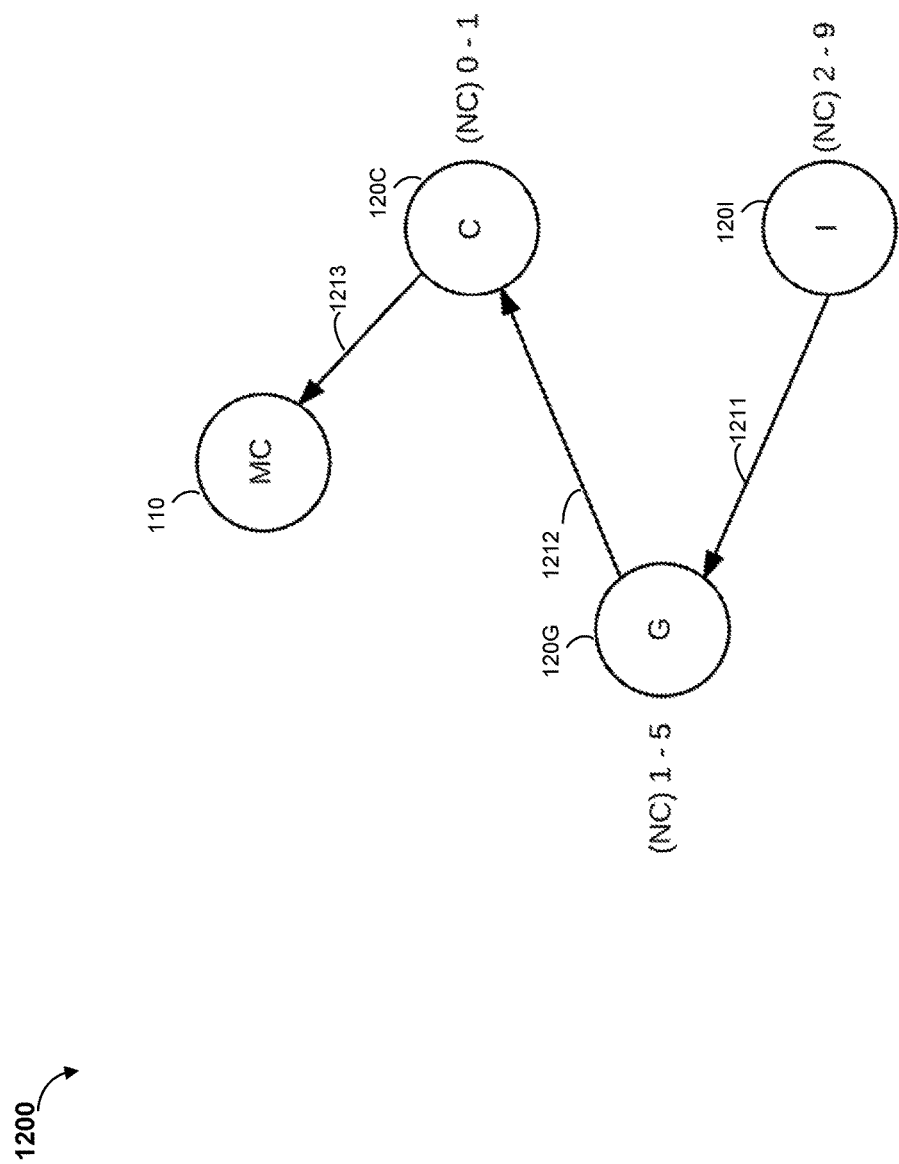
FIG. 12 depicts a diagram of a subset of network cells of the network of FIG. 3 in communication with the master cell, in accordance with some example implementations.

FIG. 12 is a diagram 1200 of a subset of network cells 120 of network 300 of FIG. 3 in communication with the MC 110, in accordance with some example implementations. FIG. 12 is similar to, and adapted from FIG. 11 and illustrates an example of the second category of packet transfer. As shown in FIG. 12, a packet originates at the NC 120I in response to the NC 120I receiving a packet from the MC 110, such as a CTS, indicating that the NC 120I is enabled to upload its buffer contents. During network assembly, each NC 120 saves the network ID of the layer N−1 gateway cell (GC) that assimilated the NC 120 into the network. In the example of FIG. 12, the NC 120G is the GC of NC 120I, NC 120C is the GC of NC 120G, and the MC 110 is the GC for NC 120C.

For an AT packet to propagate to the MC 110 via multiple transfers, each NC 120 simply transfers the packet to its associated gateway cell (GC). As shown, NC 120I first transmits the packet to the NC 120G in transmission 1211, which then transfers the packet to the NC 120C in transmission 1212, which further transfers the packet to the MC 110 in transmission 1213. In some aspects, all network packets, both ET and AT, may incorporate a full handshake, closed loop packet transfer to prevent packet loss. The addressed NC 120 may generate an acknowledgement (ACK) packet on reception of an ET packet from the MC 110. Similarly, the MC 110 may generate an ACK packet on reception of an AT packet from the enabled NC 120. In some implementations, if the ACK packet is not received in a pre-determined period, the packet may be resent by the sending NC 120.

For the third category of packet transfer, the NC 120 packet transfer to an addressed network RFED 180 may be the final transfer originating from the MC 110. All ET packet transfers to a network RFED 180 may be completed via the RFED local NC 120. The association of the local NC 120 and the RFED 180 may be stored in the MC 110 registry generated when the RFED 180 first attempts to join the network upon power-up.

Figure 13:
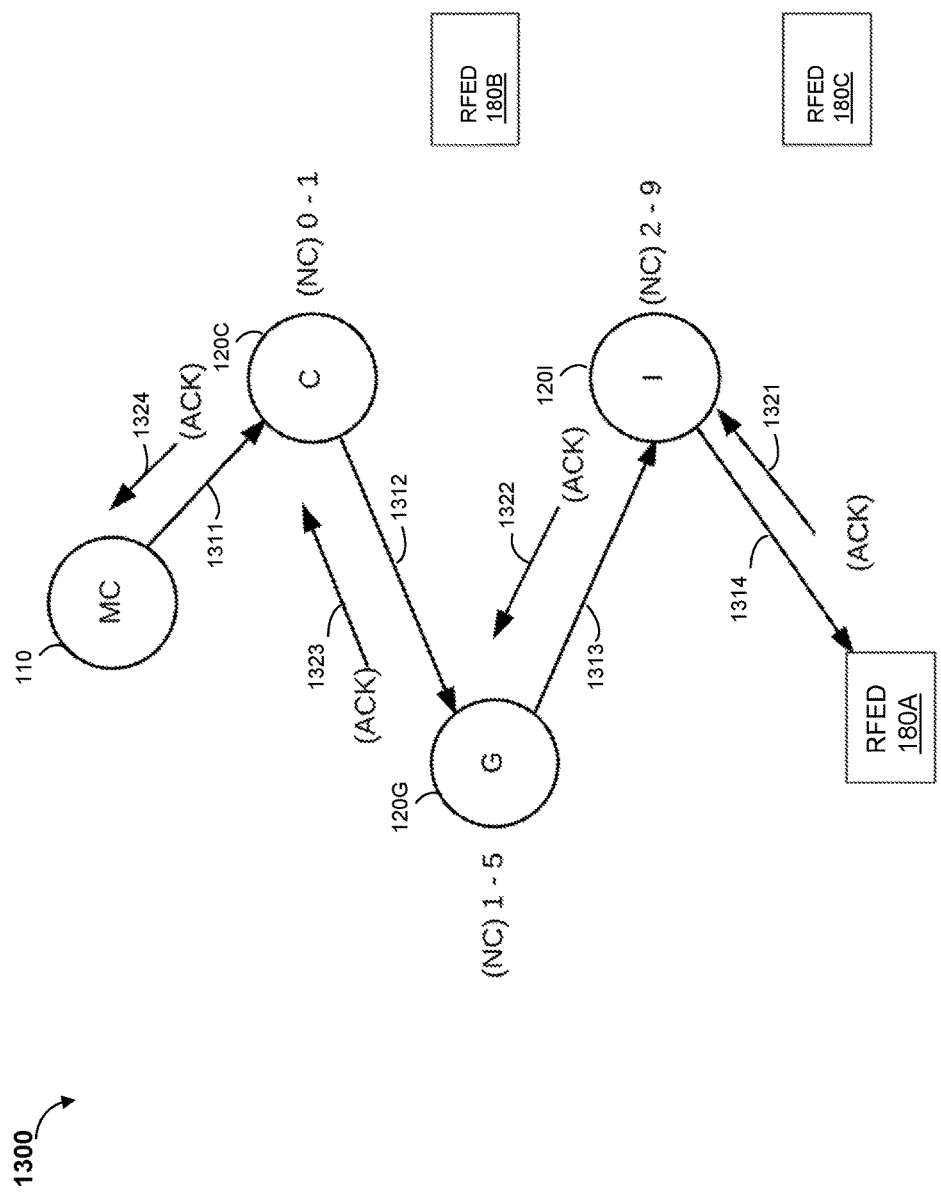
FIG. 13 depicts a diagram of a subset of network cells of the network of FIG. 3 in communication with the master cell and radio frequency enabled devices (RFEDs), in accordance with some example implementations.

FIG. 13 is a diagram 1300 of a subset of network cells 120 of network 300 of FIG. 3 in communication with the MC 110 and RFEDs 180, in accordance with some example implementations. FIG. 13 is similar to, and adapted from FIG. 12 and illustrates an example of the third category of packet transfer. As shown in FIG. 13, upon receipt of the ET packet from the MC 110, via transmissions 1311, 1312, and 1313, the local destination NC 120I may immediately transfer to the packet to the addressed RFED 180A in transmission 1314 without storing to its buffer. Upon receipt of the ET packet in transmission 1314, the addressed network RFED 180A may respond with an ACK 1321 to the MC 110, via ACK transmissions 1322, 1323, and 1324, to close the loop.

For the fourth category of packet transfer, packets generated by a network RFEDs 180 are not required to be synchronous. These packets may be addressed to the local NC 120 that is identified during the registration process when the RFED 180 first attempts to join the network.

Figure 14:
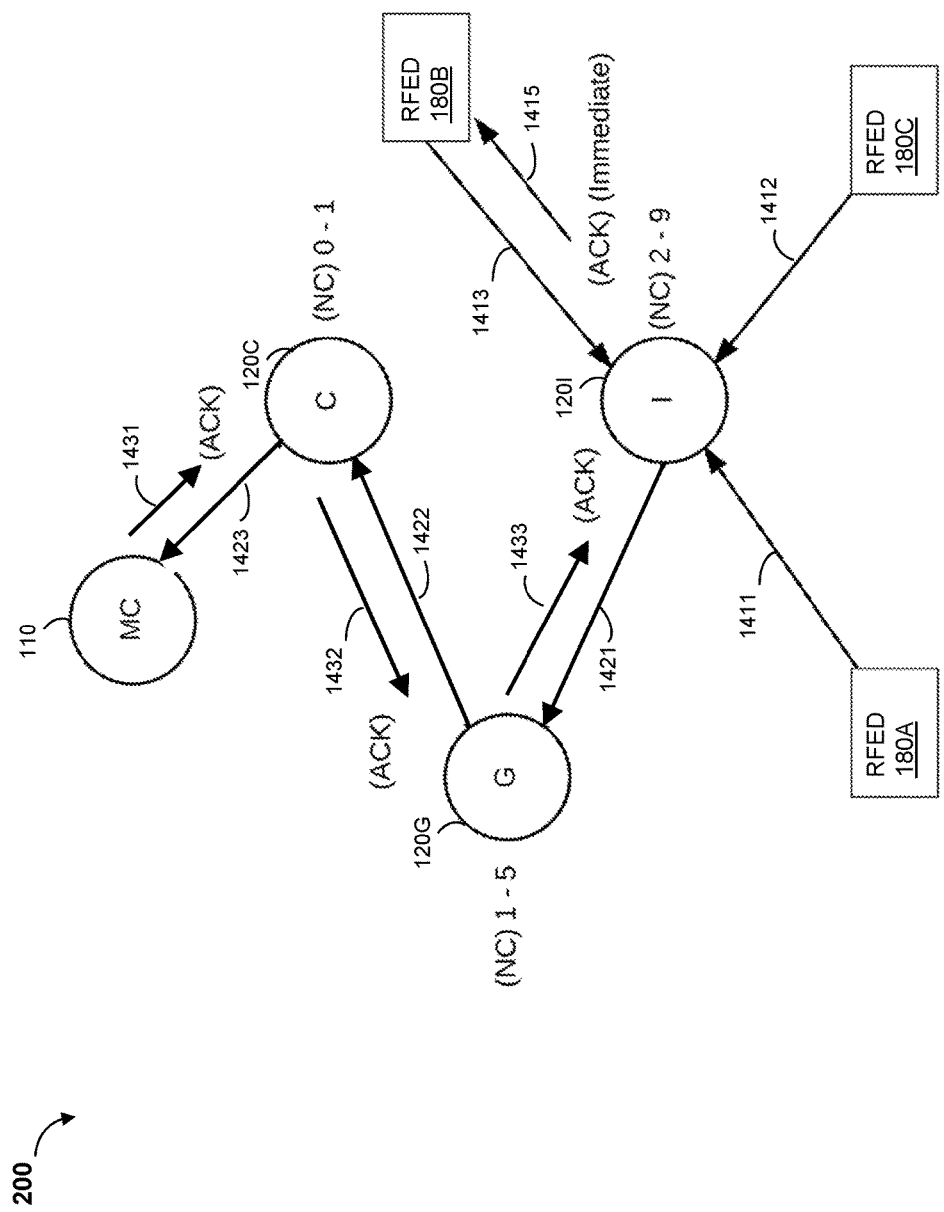
FIG. 14 depicts a diagram of a subset of network cells of the network of FIG. 3 in communication with the master cell and radio frequency enabled devices (RFEDs), in accordance with some example implementations.

FIG. 14 is a diagram 1400 of a subset of network cells 120 of network 300 of FIG. 3 in communication with the MC 110 and RFEDs 180, in accordance with some example implementations. FIG. 14 is similar to, and adapted from FIG. 13 and illustrates an example of the fourth category of packet transfer. As shown in FIG. 14, the RFEDs 180A, 180B, and 180C are in communication with the NC 120I. The RFEDs 180 transmit packets to the NC 120I for routing to the MC 110 and ultimately, their final destination. Upon receipt of the RFEDs 180 packets by the local NC 120I, synchronized, or unsynchronized, the packets are saved to the local NC 120I buffer and not immediately transferred to the MC 110.

In response to receiving the RFED packet 1413 from an individual RFED 180B, the local NC 120I may send an immediate ACK 1415 to the sending RFED 180B, as shown in FIG. 14. In some aspects, a command packet, such as a CTS, from the MC 110, may trigger the NC 120I to transfer the packets stored in its buffer to the MC 110 in sequence. For example from NC 120I to NC 120G, to NC 120C to MC 110 via packet transmissions 1421, 1422, and 1423. In some aspects, the MC 110 may acknowledge receipt of the AT packets by sending an ACK 1431, which is transferred by NC 120C via ACK 1432, which is transferred by NC 120G to NC 120I via ACK 1433. In some aspects, if the master cell ACK 1433 is not received by the NC 120I, the packet may be resent until the ACK is received.

As noted above, the NCs 120 described herein may include relatively inexpensive components. This may allow for easier extension of network coverage by adding more NCs 120 where needed without the need for expensive and time consuming installation and/or configuration. The spatial distribution of the NCs 120 in a location may be based on one of two requirements: 1) coverage of the entire spatial volume and 2) coverage of a known static RFED 180 distribution (e.g., location of fixed factory equipment configured to communicate within the network). The coverage of an entire spatial volume, such as a factory, may be dependent on the RF range of the RFEDs 180 expected to be operating in the network. For example, some factory equipment configured as RFEDs 180, such as IoT devices, may have a relatively short range and may be handheld so more NCs 120 may be needed. More NCs 120 may be desirable if the RFED 180 distribution is dynamic and/or the actual location of the static RFEDs 180 cannot be anticipated.

In the first requirement, the NC 120 distribution may be based solely on the RF range of the lowest powered RFED 180 to be expected. A graphical program, such as CAD, may be used to visualize the required network cell (NC) distribution based on the known RF range of the network RFEDs 180. The NC 120 distribution may ensure every network RFED will be in RF range of at least one NC 120. For the known static RFED 180 distribution, the NC 120 distribution may provide coverage for only the sub-set of the coverage volume that incorporates the known static RFED 180 distribution and thus may use less NCs 120.

In some implementations, the number of NCs 120 and/or RFEDs 180 in a given spatial area may exceed the capacity of the MC 110 to handle all NCs 120 and/or RFEDs 180 efficiently. In some aspects, the MC 110 may be configured to handle up to a threshold amount of NCs 120, such as 64,000 NCs 120. If the number of NCs 120 exceeds the threshold or if a network performance metric, such as network bandwidth, falls below a threshold, the network may implement two or more sub-master cells (SMCs) to extend the capacity of the network. In some aspects, the SMC may be identical to the MC 110 in function, hardware, and/or firmware.

In some implementations, on power-up, common code executed at a cell may determine if a remote server interface layer (RSIL) module has been installed in the module socket of the SMC. If the RSIL module is found, the cell may default to a master cell role in the network. If not found, the cell defaults to a sub-master cell role in the network. The use of sub-master cells in the network may be optional. If a single master cell network provides adequate packet bandwidth for a given application, sub-master cells may be unnecessary and the single master cell may form a single master network out of the available NCs 120.

If SMCs are implemented, the MC 110 may assemble the multiple SMCs deployed in the network into a master network that does not include any of the NCs 120. The NCs 120 may be formed later as described herein, with each NC 120 controlled by the respective SMC and operating on a unique network channel. This format may allow for multiple sub-networks to operate simultaneously in the same physical space without packet collisions, linearly increasing the overall network bandwidth by X, where X is the number of sub-networks formed out of the available NCs 120 deployed in the same space as the SMCs.

In aspects, the SMCs are assembled into a series of star/tree networks identical in structure to NC 120 star formation described above with reference to FIGS. 4A-9B. Once the SMC network is formed under control of the single MC 110, each SMC may be sequentially enabled to form a star/tree network topology. This may result in a fractal pattern as the network assembly done by the multiple SMCs repeats at a smaller scale, which defines a fractal.

Once the multiple network SMCs are assimilated into the master network, each SMC independently assembles a sub-network out of a sub-set of the available NCs 120 within acceptable RF range of an individual SMCs. Ultimately, all the NCs 120 will be uniquely integrated into one of the available sub-networks.

Sub-network AT packets are received by the respective SMC and stored in the respective SMC buffer. These packets are not immediately transferred to the network MC 110. The individual SMCs are enabled sequentially to upload their respective buffer packets, fully synchronized. Packet transfer between the sub-set of NCs 120, and the associated SMC, are independent, with each sub-network operating on a unique network channel. SMC assembly and packet synchronization utilize a command packet set similar to that described herein with respect to NC 120 assembly and packet synchronization.

In some implementations, NCs 120 may fail due to a power outage, electromagnetic pulse, natural disaster, and/or the like. Cell failure, for any reason, may be detected during the network poll period executed by the MC 110 described above. For example and as noted above, once a NC 120 is sequentially enabled, it will upload any saved packet in its buffer, such as a FIFO buffer. Upon completion of the FIFO upload, the enabled NC 120 may terminate its upload cycle by sending a packet to the MC 110 indicating that its buffer is empty. In some aspects, the packet includes a BUFFER-CLEAR (BC) packet. In response to receiving the BC packet, the MC 110 may then enable the next sequential NC 120 upload cycle. If the enabled NC 120 has no packets saved in its buffer, only the BC packet is sent to the MC 110 to terminate the upload sequence. In some aspects, the BC packet may be used by the MC 110 to determine the state of the enabled NC 120.

In some implementations, each NC 120 uses one or more radio modules to communicate to both the RFEDs 180 as well as the other NCs 120. By using a single radio module, a packet from an RFED 180 may be sent asynchronously to a NC 120 engaged in a packet transfer from another NC 120 in a N+1 layer. This may result in a lost packet due to collision. In some aspects, the packet may be re-transmitted by the sending NC 120 due to not receiving an acknowledgment from the MC 110 to indicate the packet was received. In some aspects, some bandwidth may be lost due to the necessary re-transmission.

To address this potential issue in high packet density applications, a second radio module, or more, can be added to the NCs 120 to allow the communication between the RFEDs 180 and the NCs 120 to operate on a separate channel, band, and/or protocol, aside from the chosen network channel being used by the network communication via a MIST protocol. Both, or multiple, radio modules may be configured in a default reception mode. Accordingly, interference between the two or multiple radio modules may be reduced or eliminated on a common NC 120. This may allow RFED 180 packets to be received by the local NC 120 without interfering with the network packet transfer, which also may allow a higher packet transfer density.

Each NC 120 may incorporate a network watchdog timer (WDT) that is reset on receipt of a command packet from the MC 110 that enables the NC 120, such as the CTS packet. If this WDT exceeds three poll periods before being reset by a CTS, the NC 120 may determine that communication to the MC 110 has been dropped. The affected NC 120 may default back to an unconnected cell state on the discover channel and wait to be re-assimilated to the network by the MC 110.

In some implementations, the MC 110 may detect this NC 120 drop-out by the lack of a response, such as a BC, from the NC 120 after the CTS packet has been sent to the addressed NC 120. In some aspects, if a number of sequential CTS packets do not receive a response, such as a BC), from the addressed NC 120, the MC 110 may determine that the addressed NC 120 has dropped its network connection for some unknown reason.

In response to a dropped NC 120 determination, the MC 110 may generate a packet to send to the remote server 150 to report the dropped NC 120 so a remote server application may update the network map. In some aspects, the packet transmitted to the remote server 150 includes a DROPPED CELL REPORT packet. The MC 110 may also attempt to re-establish network communication with the dropped NC 120. This attempt may follow the same sequence as described above with respect to FIGS. 4A-9B. If communication is re-established, the MC 110 may generate and send a report packet to the remote server 150 indicating that the NC 120 has been re-established. In some aspects, the report packet includes a NEW CELL REPORT which is sent to an application on the remote server 150 to update the network map. In some implementations, if a DROPPED CELL REPORT is not followed by a NEW CELL REPORT for the same network cell ID, the remote server application may generate an event to alert a user of the application that a NC 120 has permanently dropped out and the connection cannot be restored, requiring manual service.

The networks described herein may be designed to operate as fail-safe. As long as power is applied to the MC 110 and NCs 120, the network may continue to operate despite one or multiple NC 120 failures. The NCs 120 may continuously reconfigure the network connections in a "self-healing" effort to maintain communication to all functional network cells. As the network reconfigures the connections to isolate a failed network cell (NC), reports may be sent to the server application to allow re-mapping of the new network configuration in real time. Additionally, cell to cell connections may be continuously altered in response to RF signal strength variations. If the RF signal strength reduces below a threshold level, such as a new source of interference is created, a new gateway cell (GC) connection may be established if it is available for any given NC 120. As these reconnections occur, reports may be sent to the server application to allow real-time network re-mapping as with cell failure.

The network protocol for the networks described herein, such as networks 100, 200, and 300, may be based on the NCs 120 executing a set of pre-defined functions. These functions may be associated with specific code embedded in the all communication packets transmitted in the network. In some aspects, all network packets may include an embedded function code in a common parameter field within the packet structure. On reception of the packet, the addressed NC 120 may immediately execute the function associated with the code, using the parameters included in the received packet. The network protocol packet communications described herein supports packet transfer between and among the MC 110, NCs 120, RFEDs 180, and/or the remote server 150. In some aspects, an RFED 180 in one network executing the protocol may communicate with other RFEDs 180 in the same network and/or RFEDs 180 in a remote network executing the same protocol.

In some implementations, the network protocol may also implement command packets to effectively function as a network interrupt. This packet type may be referred to as a NO LATENCY packet and may be used for events that cannot tolerate the delay associated with saving the packet to the local NC 120 buffer, then transferred synchronously as an AT packet upon receipt of a packet, such as a CTS packet, from the MC 110 indicating that the local NC 120 should upload its buffer. This packet type may be used sparingly because it may not be transferred synchronously to the MC 110. To minimize potential packet collisions for this packet, the generating RFEDs 180, or NCs 120, may use a radio carrier detect (CD) function of a radio to test if any packets are currently being transferred before the transfer of these no latency packets is initiated. In some aspects, the MC 110 may transmit the NO LATENCY packet to trigger an immediate upload of packets from an NC 120. The use of no latency packets may be particularly useful in security applications that require immediate response, such as a door or window sensor.

Figure 15:
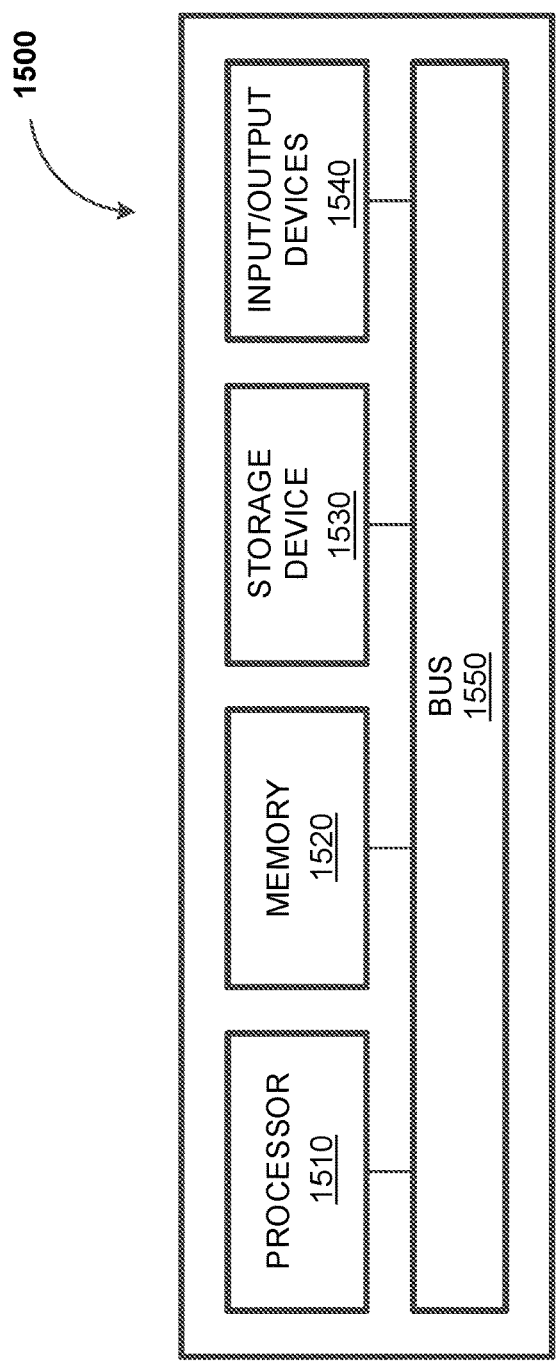
FIG. 15 depicts a block diagram of an example computing apparatus, in accordance with some example implementations.

FIG. 15 depicts a block diagram illustrating a computing apparatus 1500 consistent with implementations of the current subject matter. Referring to FIGS. 1-14, the computing apparatus 1500 may be used to implement the MC 110, the NC 120, the remote server 150, the RFED 180, and/or any components therein. Computing apparatus 1500 may perform one or more of the processes described herein.

As shown in FIG. 15, the computing apparatus 1500 may include a processor 1510, a memory 1520, a storage device 1530, and input/output devices 1540. The processor 1510, the memory 1520, the storage device 1530, and the input/output devices 1540 may be interconnected via a system bus 1550. The processor 1510 is capable of processing instructions for execution within the computing apparatus 1500. Such executed instructions may implement one or more components of, for example, a computing device or a server. In some example embodiments, the processor 1510 may be a single-threaded processor. Alternately, the processor 1510 may be a multi-threaded processor. The processor 1510 is capable of processing instructions stored in the memory 1520 and/or on the storage device 1530 to display graphical information for a user interface provided via the input/output device 1540.

The memory 1520 is a computer readable medium such as volatile or non-volatile that stores information within the computing apparatus 1500. The memory 1520 may store data structures representing configuration object databases, for example. The storage device 1530 is capable of providing persistent storage for the computing apparatus 1500. The storage device 1530 may be a floppy disk device, a hard disk device, an optical disk device, or a tape device, or other suitable persistent storage means. The memory 1520 and/or storage device 1530 may include a database within the computing apparatus 1500 or a databased stored on a server in communication with the computing apparatus 1500. In some aspects, the memory 1520 may include a cloud server in communication with the computing apparatus 1500 over a wired or wireless network. The input/output device 1540 provides input/output operations for the computing apparatus 1500. In some example embodiments, the input/output device 1540 includes a keyboard and/or pointing device. In various implementations, the input/output device 1540 includes a display unit for displaying graphical user interfaces.

According to some example embodiments, the input/output device 1540 may provide input/output operations for a network device. For example, the input/output device 1540 may include Ethernet ports or other networking ports to communicate with one or more wired and/or wireless networks (e.g., a local area network (LAN), a cellular network, Bluetooth, a wide area network (WAN), the Internet). Wireless networks may include WiFi, WiMax, and cellular networks (2G/3G/4G/5G), and/or any other wireless network. In some implementations, the networks 100, 200, 300, and/or the like may be referred to as multiple-input synchronous transfer (MIST) networks, however, they may implement any of the wireless networks described herein. In order to effectuate wireless communications, the network interface 1540, for example, may utilize one or more antennas, receivers, transmitters, transceivers, and/or the like. In some aspects, the network interface 1540 may include the RSIL and or the radio subsystem described herein.

Apparatus 1500 may include one or more user interfaces. The user interface may include hardware or software interfaces, such as a keyboard, mouse, or other interface, some of which may include a touchscreen integrated with a display. In some aspects, the user interface may include one or more of the sensors described herein and/or may include an interface to one or more of the sensors described herein. The operation of these sensors may be controlled at least in part by a sensor module. The apparatus 1500 may also include and input and output filter which may filter information received from the sensors or other user interfaces, received and/or transmitted by the network interface, and/or the like.

In some example embodiments, the computing apparatus 1500 may be used to execute a network protocol in the various network devices that may be used for multiple-input synchronous communications that may allow for low loss, high accessible packet transfer in a self-forming, self-healing, and self-optimizing network.

Figure 16:
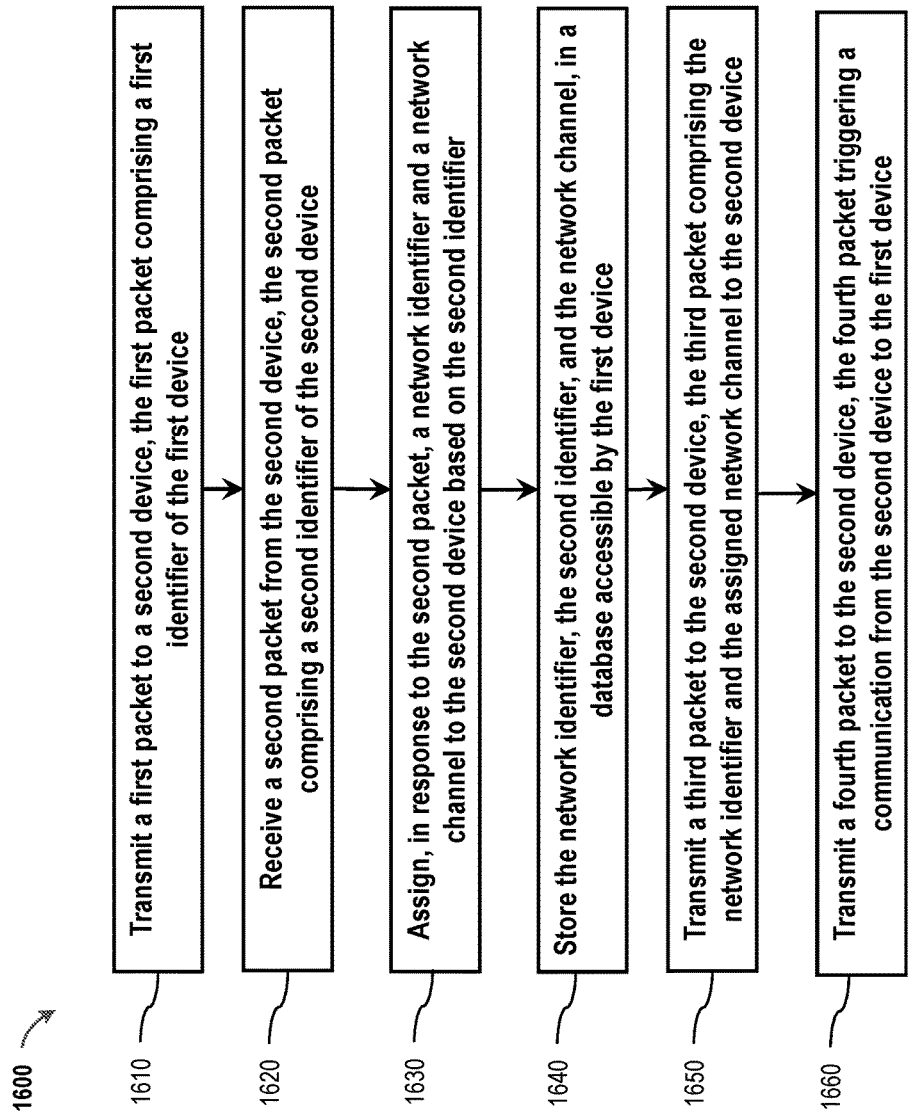
FIG. 16 depicts an example of a process, in accordance with some example implementations.

FIG. 16 illustrates a flowchart of a method for wireless communication, in accordance with some example implementations. In various implementations, the method 1600 (or at least a portion thereof) may be performed by one or more of the MC 110, the NC 120, the remote server 150, the RFED 180, the computing apparatus 1500, other related apparatuses, and/or some portion thereof.

Method 1600 may start at operational block 1610 where the apparatus 1500, for example, may transmit a first packet to a second device, the first packet including a first identifier of the first device. Method 1600 may proceed to operational block 1620 where the apparatus 1500, for example, may receive a second packet from the second device, the second packet comprising a second identifier of the second device.

Method 1600 may proceed to operational block 1630 where the apparatus 1500, for example, may assign, in response to the second packet, a network identifier and a network channel to the second device based on the second identifier. In some aspects, the network identifier indicates an order of assimilation of the second device to a network.

Method 1600 may proceed to operational block 1640 where the apparatus 1500, for example, may store the network identifier, the second identifier, and the network channel, in a database accessible by the apparatus 1500.

Method 1600 may proceed to operational block 1650 where the apparatus 1500, for example, may transmit a third packet to the second device. In some aspects, the third packet includes the network identifier and the assigned network channel to the second device. Method 1600 may proceed to operational block 1660 where the apparatus 1500, for example, may transmit a fourth packet to the second device. In some aspects, the fourth packet triggers a communication from the second device to the first device. In some implementations, the communication includes data associated with a third device in communication with the second device. In some implementations, the first packet comprises a DISCOVER-SYNC packet, the second packet comprises a NEW-CELL packet, the third packet comprises a CONNECT packet, and the fourth device comprises a CTS packet.

Performance of the method 1600 and/or a portion thereof may allow for high assurance and fully synchronized wireless communication within a network. These communications may result in low or minimal packet loss due to collisions because transmissions by NCs 120 to/from the MC 110 are allocated the full network bandwidth.

Although several aspects are described herein with respect to IoT devices and networks, other implementations are possible. For example, the networks and devices described herein may apply equally to cellular and/or Wi-Fi networks.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic input, speech input, tactile input, and/or the like. Other possible input devices include touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such phrases are intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." The use of the term "based on," above and in the claims is intended to mean "based at least in part on," such that a feature or element that is not recited is also permissible.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:
1. A method comprising:
transmitting, by a first device, a first packet to a second device, the first packet comprising a first identifier of the first device;
receiving, by the first device, a second packet from the second device, the second packet comprising a second identifier of the second device;
assigning, by the first device and in response to the second packet, a network identifier and a network channel to the second device based on the second identifier, the network identifier indicating an order of assimilation of the second device to a network;

storing, by the first device, the network identifier, the second identifier, and the network channel, in a database accessible by the first device;

transmitting, by the first device, a third packet to the second device, the third packet comprising the network identifier and the assigned network channel to the second device; and transmitting, by the first device, a fourth packet to the second device, the fourth packet triggering a communication from the second device to the first device, the communication comprising data associated with a third device in communication with the second device.

2. The method of claim 1, wherein the storing comprises storing the network identifier, the second identifier, and the network channel at a remote server.

3. The method of claim 1, wherein the first device comprises:
a transmitter configured to transmit the first packet, the third packet, and/or the fourth packet;
a receiver configured to receive the second packet; and
a processor configured to perform the assigning and/or the storing.

4. The method of claim 1, wherein the second identifier comprises a serial number of the second device.

5. The method of claim 1, wherein the assigning comprises:
determining a number of devices connected to the first device; and
assigning, based on the number of devices, the network identifier to the second device, the network identifier indicating a next sequential integer greater than the number of devices.

6. The method of claim 1, wherein the second packet indicates a layer of a network where the second device is located, and wherein the assigning of the network identifier is based on the layer.

7. The method of claim 1, further comprising:
receiving, by the first device, a fifth packet from the second device, the fifth packet comprising a third identifier of a fourth device; and
assigning, by the first device and in response to the fifth packet, a second network identifier and a second network channel to the fourth device based on the third identifier, the second network identifier indicating an order of assimilation of the third device to the network.

8. The method of claim 1, further comprising transmitting, by the first device, a fifth packet to the second device, the fifth packet indicating that the second device transmit a sixth packet, the sixth packet comprising the second identifier and triggering a response from a fourth device within a communication range of the second device.

9. The method of claim 1, wherein the communication from the second device to the first device is over the assigned network channel.

10. The method of claim 1, wherein each of the first packet, the second packet, the third packet, the fourth packet, and the communication are transmitted synchronously in a network comprising the first device, the second device, and the third device.

11. A system comprising:
at least one processor; and
at least one memory storing instructions which, when executed by the at least one processor, result in operations comprising:

transmitting, by a first device, a first packet to a second device, the first packet comprising a first identifier of the first device;

receiving, by the first device, a second packet from the second device, the second packet comprising a second identifier of the second device;

assigning, by the first device and in response to the second packet, a network identifier and a network channel to the second device based on the second identifier, the network identifier indicating an order of assimilation of the second device to a network;

storing, by the first device, the network identifier, the second identifier, and the network channel, in a database accessible by the first device;

transmitting, by the first device, a third packet to the second device, the third packet comprising the network identifier and the assigned network channel to the second device; and transmitting, by the first device, a fourth packet to the second device, the fourth packet triggering a communication from the second device to the first device, the communication comprising data associated with a third device in communication with the second device.

12. The system of claim 11, wherein the storing comprises storing the network identifier, the second identifier, and the network channel at a remote server.

13. The system of claim 11, wherein the first device comprises:
a transmitter configured to transmit the first packet, the third packet, and/or the fourth packet;
a receiver configured to receive the second packet; and
a processor configured to perform the assigning and/or the storing.

14. The system of claim 11, wherein the second identifier comprises a serial number of the second device.

15. The system of claim 11, wherein the assigning comprises:
determining a number of devices connected to the first device; and
assigning, based on the number of devices, the network identifier to the second device, the network identifier indicating a next sequential integer greater than the number of devices.

16. The system of claim 11, wherein the second packet indicates a layer of a network where the second device is located, and wherein the assigning of the network identifier is based on the layer.

17. The system of claim 11, wherein the operations further comprise:
receiving, by the first device, a fifth packet from the second device, the fifth packet comprising a third identifier of a fourth device; and
assigning, by the first device and in response to the fifth packet, a second network identifier and a second network channel to the fourth device based on the third identifier, the second network identifier indicating an order of assimilation of the third device to the network.

18. The system of claim 11, wherein the operations further comprise transmitting, by the first device, a fifth packet to the second device, the fifth packet indicating that the second device transmit a sixth packet, the sixth packet comprising the second identifier and triggering a response from a fourth device within a communication range of the second device.

19. The system of claim 11, wherein the communication from the second device to the first device is over the assigned network channel.

20. The system of claim 11, wherein each of the first packet, the second packet, the third packet, the fourth packet, and the communication are transmitted synchronously in a network comprising the first device, the second device, and the third device.

21. A non-transitory computer program product storing instructions which, when executed by at least one data processor, causes operations comprising:
- transmitting, by a first device, a first packet to a second device, the first packet comprising a first identifier of the first device;
- receiving, by the first device, a second packet from the second device, the second packet comprising a second identifier of the second device;
- assigning, by the first device and in response to the second packet, a network identifier and a network channel to the second device based on the second identifier, the network identifier indicating an order of assimilation of the second device to a network;
- storing, by the first device, the network identifier, the second identifier, and the network channel, in a database accessible by the first device;
- transmitting, by the first device, a third packet to the second device, the third packet comprising the network identifier and the assigned network channel to the second device; and
- transmitting, by the first device, a fourth packet to the second device, the fourth packet triggering a communication from the second device to the first device, the communication comprising data associated with a third device in communication with the second device.

* * * * *